US012492554B2

(12) United States Patent
Colpaert et al.

(10) Patent No.: US 12,492,554 B2
(45) Date of Patent: Dec. 9, 2025

(54) DYNAMIC CANVAS TENSIONING SYSTEM

(71) Applicant: Renson Outdoor NV, Kruisem (BE)

(72) Inventors: Stijn Colpaert, Oudenaarde (BE); Joost Benjamin Renaat De Frene, Waregem (BE); Thomas Brecht Vervisch, Bissegem (BE); Kristof Lemiegre, Gentbrugge (BE); Bart Abeel, Sint-Eloois-Winkel (BE)

(73) Assignee: Renson Outdoor NV, Kruisem (BE)

( * ) Notice: Subject to any disclaimer, the term of this patent is extended or adjusted under 35 U.S.C. 154(b) by 482 days.

(21) Appl. No.: 18/247,370

(22) PCT Filed: Oct. 13, 2021

(86) PCT No.: PCT/IB2021/059405
§ 371 (c)(1),
(2) Date: Mar. 30, 2023

(87) PCT Pub. No.: WO2022/079631
PCT Pub. Date: Apr. 21, 2022

(65) Prior Publication Data

US 2023/0417056 A1 Dec. 28, 2023

(30) Foreign Application Priority Data

Oct. 14, 2020 (BE) .................................. 2020/5717

(51) Int. Cl.

| | |
|---|---|
| ***E04B 9/22*** | (2006.01) |
| ***E04C 2/38*** | (2006.01) |
| ***E04D 5/14*** | (2006.01) |
| ***E06B 9/24*** | (2006.01) |
| *B44D 3/18* | (2006.01) |

(Continued)

(52) U.S. Cl.
CPC ................ *E04C 2/384* (2013.01); *E04B 9/22* (2013.01); *B44D 3/18* (2013.01); *E04B 9/242* (2013.01); *E04B 9/28* (2013.01); *E04D 5/14* (2013.01); *E04D 5/142* (2013.01);
(Continued)

(58) Field of Classification Search
None
See application file for complete search history.

(56) References Cited

U.S. PATENT DOCUMENTS 3,581,453 A * 6/1971 Jones .................... E04B 9/0478 52/506.1
3,741,631 A * 6/1973 Laing ..................... A01G 13/21 359/228

(Continued)

FOREIGN PATENT DOCUMENTS

WO 2020/114618 A1 6/2020

OTHER PUBLICATIONS

International Search Report and Written Opinion for Int'l Application No. PCT/IB2021/059405, Date of Mailing: Feb. 1, 2022.

*Primary Examiner* — Phi D A
(74) *Attorney, Agent, or Firm* — Hamilton, Brook, Smith & Reynolds, P.C.

(57) ABSTRACT

The present invention relates to means and methods for tensioning duck or canvas. In particular, the present invention provides a tensioning system wherein a canvas can be tensioned dynamically along one or two sides of a frame. The present invention also further provides a method for dynamic tensioning of a canvas on one or two sides of a frame.

21 Claims, 17 Drawing Sheets

(51) Int. Cl.

| | |
|---|---|
| *E04B 9/24* | (2006.01) |
| *E04B 9/28* | (2006.01) |
| *E04F 10/06* | (2006.01) |
| *E04F 13/00* | (2006.01) |

(52) U.S. Cl.

CPC ......... *E04F 10/0637* (2013.01); *E04F 13/002* (2013.01); *E04F 13/005* (2013.01); *E06B 9/24* (2013.01)

(56) References Cited

U.S. PATENT DOCUMENTS

| | | | | |
|---|---|---|---|---|
| 4,571,897 | A * | 2/1986 | Kerr | E04D 13/032 52/13 |
| 4,645,700 | A | 2/1987 | Tadaaki et al. | |
| 5,469,672 | A * | 11/1995 | Fisher | E04F 10/02 52/717.03 |
| 6,431,251 | B1 * | 8/2002 | Yerusalim | E04B 9/303 160/327 |
| 10,174,507 | B1 * | 1/2019 | Henbid | E04F 13/005 |
| 2004/0221972 | A1 * | 11/2004 | Tomlinson | E04B 9/303 160/327 |
| 2010/0077686 | A1 * | 4/2010 | Bowen | G09F 1/12 52/506.06 |
| 2016/0230391 | A1 * | 8/2016 | Fox | E04F 10/02 |
| 2019/0128013 | A1 * | 5/2019 | Hoffmann | E04H 15/646 |
| 2020/0002952 | A1 * | 1/2020 | Koch | E04F 13/005 |
| 2023/0295922 | A1 * | 9/2023 | Pugachev | E04B 9/18 411/84 |

* cited by examiner

DYNAMIC CANVAS TENSIONING SYSTEM

This application is the U.S. National Stage of International Application No. PCT/IB2021/059405, filed on Oct. 13, 2021, which designates the U.S., published in English, and claims priority under 35 U.S.C. § 119 or 365 (c) to Belgian Application No. 2020/5717, filed Oct. 14, 2020. The entire teachings of the above applications are incorporated herein by reference.

TECHNICAL FIELD

The present invention relates to means and methods for tensioning duck or canvas. In particular, the present invention provides a tensioning system, wherein a canvas can be tensioned dynamically along one or two sides of a frame. The present invention also further provides a method for dynamic tensioning of a canvas on one or two sides of a frame.

TECHNOLOGICAL BACKGROUND OF THE INVENTION

Traditionally, a canvas is fastened to a frame by means of conventional fastening elements, such as clamps, nails or hooks. It is extremely important that the canvas is tensioned around the frame to be perfectly tight and flat without wrinkles or creases. Now, the least imperfection will lead to an aesthetically inferior product. Mainly at the level of the corners, it is difficult to obtain a perfect finish. Tensioning of canvases is thus also very specialized work with difficult operations, requiring considerable experience to accomplish it.

However, good tensioning of a canvas under a constant, static tension has a limited lifetime. On the one hand, the necessary canvas tension will change over the course of time as a result of natural expansion of the canvas itself. On the other hand, the canvas is not resistant to external pressure and may be stretched, for example through the action of the wind. An expanded or stretched canvas will in the course of time form creases.

The above problems are even more prominent when tensioning double-sided frames, i.e. frames where two canvases are fastened on either side of the frame. The available surface area for concealing the fasteners is limited to the lateral edges of the frame. In modern building there is a trend for as many elements as possible to be hidden from view. The visible presence of fastening elements is considered to be less aesthetic. This makes the possible maintenance of canvases additionally difficult because often both canvases must be unclamped, even when only one canvas needs to be replaced.

There is thus a need to develop improved means for rectifying the shortcomings of the prior art. In particular, there is a need to make the tensioning of canvases simpler and more user-friendly. Moreover, there is also a need to make the dismounting of canvases simpler and more user-friendly. Furthermore, there is also a need for all means for fastening the canvas to be almost completely hidden from view. In addition, a solution is also needed for preventing the change in canvas tension of a tensioned canvas over the course of time.

SUMMARY

In order to satisfy the needs described above, the inventors have developed methods and means for tensioning a canvas around a frame. In particular, the present invention relates to a single-sided or double-sided tensioning system for dynamic tensioning of a canvas respectively on one or both sides of a frame. The dynamic tensioning system is arranged so that it can give when the canvas is pressed or touched, for example by being struck or in strong wind, but then the canvas will tauten again. The main advantage of the dynamic tensioning system is that the canvas can be tensioned perfectly tightly and flat in a simple and user-friendly manner, even with limited experience in this field. Further advantages of the dynamic tensioning system are explained in more detail in the description. It is clear that the dynamic tensioning system allows the tension to be applied to the canvas in such a way that with an indentation, whether or not temporary, and/or a change in length of the canvas, the tension is applied permanently, automatically, i.e. without any need for a further operation or intervention, for example by means of spring elements. This is in contrast to a static tensioning system, wherein the tension is applied on the canvas statically during initial tensioning of the canvas, and wherein a change in length or pressing-in of the canvas will give rise to a change of the tension in the canvas, which cannot be compensated automatically, i.e. without an intervention for tautening the canvas again statically.

One aspect of the invention relates to a single-sided tensioning system for dynamic tensioning of a canvas on a side of a frame, which is assembled substantially from four or more frame profiles, the tensioning system comprising: a frame profile comprising a back wall with an upright central part and two upright side walls, which extend in the lateral direction of the frame; wherein the frame profile is provided with at least one stop; a guide provided with a means for fastening the canvas; wherein the guide is mounted movably in the lateral direction in the frame profile between the central part and a side wall; a locking element comprising a coupling means and a blocking piece; wherein the coupling means is configured for coupling the locking element to the central part; a tensioning means configured for dynamic tensioning of the canvas fastened to the guide; wherein the tensioning means is tensioned between the stop and the guide so that it can tension this guide dynamically in the central direction of the frame and the blocking piece is arranged so that it can block a movement of this guide; and/or, the tensioning means is tensioned between the blocking piece and the guide so that it can tension this guide dynamically in the central direction of the frame and the stop is arranged so that it can block a movement of this guide; wherein the locking element and/or the blocking piece are configured to remove said blocking of the guide by means of a displacement relative to the frame profile so that the canvas, fastened to the guide, is stretched dynamically over a side wall of the frame profile by the tensioning means.

In a preferred embodiment, at least one side wall of the frame profile is provided with an inward-directed stop, preferably at one end thereof, so that the tensioning means is tensioned between this stop and the guide.

In a preferred embodiment, the central part of the frame profile is provided with at least one outward-directed stop, preferably at one end thereof, so that the tensioning means is tensioned between this stop and the guide.

In a preferred embodiment, the tensioning system comprises a stop profile, which can be coupled to the frame profile, preferably to the central part of the frame profile; wherein the stop profile, on coupling, forms at least one stop so that the tensioning means is tensioned between this stop and the guide.

One aspect of the invention relates to a double-sided tensioning system for dynamic tensioning of two canvases on either side of a frame, which is assembled substantially from four or more frame profiles, the tensioning system comprising: a frame profile comprising a back wall with an upright central part and two upright side walls, which extend in the lateral direction of the frame; wherein the frame profile is provided with at least two stops on either side; at least two guides, each provided with a means for fastening a different canvas; wherein each guide is mounted movably in the lateral direction in the frame profile between the central part and a different side wall; a locking element comprising a coupling means and at least two blocking pieces provided on either side of the locking element; wherein the coupling means is configured for coupling the locking element to the central part; at least two tensioning means configured for dynamic tensioning of the canvases fastened to the guides; wherein the tensioning means are tensioned between a different stop and guide so that they can tension these guides dynamically in the central direction of the frame and the blocking pieces are arranged so that they can block a movement of these guides and/or the tensioning means are tensioned between a different blocking piece and guide so that they can tension these guides dynamically in the central direction of the frame and the stops are arranged so that they can block a movement of this guide; wherein the locking element and/or the blocking pieces are configured for removing, by means of a displacement relative to the frame profile, said blocking of the various guides, so that the canvases, fastened to the various guides, are tensioned dynamically over different side walls of the frame profile.

In a preferred embodiment, at least each side wall of the frame profile is provided with a stop, preferably at one end thereof, so that each of the two tensioning means is tensioned between a different stop and guide.

In a preferred embodiment, the central part of the frame profile may be provided on either side with at least two outward-directed stops, preferably at one end thereof, so that each of the two tensioning means is tensioned between a different stop and guide. In a preferred embodiment, the tensioning system comprises a stop profile, which can be coupled to the frame profile, preferably to the central part of the frame profile;

wherein the stop profile, on coupling, forms at least two stops on either side so that each of the two tensioning means is tensioned between a different stop and guide.

In a preferred embodiment, the locking element is a sliding fit in the central part so that it can slide relative to the frame profile.

In a preferred embodiment the coupling means is configured to couple the locking element in at least two positions on the central part, preferably a pushed-in and a pushed-out position.

In a preferred embodiment, a displacement of the locking element from a pushed-in to a pushed-out position or from a pushed-out to a pushed-in position can tension the canvas or canvases.

In a preferred embodiment, the guide is provided with a sideways-projecting blocking wall with an end that is adapted for contact with the stop of the frame profile.

In a preferred embodiment, the back wall of the frame profile is provided with an opening under the central part so that the locking element can be placed or pushed-in along this opening in the central part.

In a preferred embodiment, the central part of the frame profile is provided with an opening so that the locking element can be placed or pushed-in along this opening in the central part.

In a preferred embodiment, the locking element is provided with at least one, preferably two impressible projections; wherein each projection is provided with an outward-directed hooking point; wherein the central part of the frame profile is provided with a hooking-in point on which a hooking point can hook tightly to couple the locking element to the central part; wherein the locking element can uncouple from the central part by pressing-in the impressible projection.

In a preferred embodiment, each impressible projection is provided with an outward-directed sloping end face, so that the projections can be pushed in by a displacement of the locking element toward the central part in the lateral direction of the frame; preferably through contact with the central part.

In a preferred embodiment, the stop of a side wall is rounded-off on the lateral edge and on the central side is provided with a notch for inserting the tensioning means.

In a preferred embodiment, the guide comprises a zip guide and the canvas is provided with a zip, which slides into the zip guide; preferably along an end direction of the frame. In a preferred embodiment, the guide is provided with a recess for inserting the tensioning means.

In a preferred embodiment, the tensioning means comprises one or more elastic and/or spring elements.

In a preferred embodiment, the tensioning means comprises an arch-shaped or wavy spring.

In a preferred embodiment, the tensioning means comprises a plurality of arch-shaped or wavy springs.

In a preferred embodiment, the blocking piece of the locking element comprises a sideways projecting wing with a flattened end adapted for contact with the guide.

In a preferred embodiment, the blocking piece of the locking element comprises a sideways projecting circle with a flattened side adapted for contact with the guide.

In a preferred embodiment, the tensioning system comprises a lateral cover profile, which is couplable to the frame profile, preferably to the central part, to form a side wall of the frame.

In a preferred embodiment, the tensioning system comprises a central cover profile, which is couplable to the frame profile, preferably to the central part, to form a central wall of the frame.

In a preferred embodiment, the tensioning system comprises a fitting, which is couplable to the frame profile, preferably to the central part, and is configured for coupling one or more frame elements; preferably selected from the list of a rail, a roller, a stopper, a lock, a hinge and/or a frame guide.

In a preferred embodiment, the central part is provided on both sides with coupling elements configured for coupling to the fitting and/or the lateral cover profile.

In a preferred embodiment, the part of the canvas fastened to the guide is located between the side walls of the frame profile.

In a preferred embodiment, the tensioning system is configured so that the guide, the part of the canvas that extends from the guide to a bending point on the side wall of the frame profile, and/or the tensioning means extend in a depth direction over a distance in the region of 60% or less, preferably in the region of 50% or less, preferably 40% or less of the distance over which the frame profile extends in the depth direction, wherein the depth direction extends transversely relative to the longitudinal direction of the frame profile and the lateral direction.

One aspect of the invention relates to a single-sided canvas frame comprising a frame provided with the tensioning system described herein and a canvas, wherein the canvas is tensioned dynamically to a side of the frame.

One aspect of the invention relates to a double-sided canvas frame comprising a frame provided with the tensioning system described herein and two canvases, wherein the canvases are tensioned dynamically to either side of the frame.

One aspect of the invention relates to a use of the tensioning system described herein for tensioning a canvas to a side of a frame.

One aspect of the invention relates to a use of the tensioning system described herein for tensioning two canvases to either side of a frame.

One aspect of the invention relates to a use of the canvas frame described herein as a roof, partition, wall, door or closure, or as a panel in a roof, partition, wall, door or closure.

DESCRIPTION OF THE FIGURES

For better illustration of the features of the invention, some preferred embodiments of the present invention are described in the appended figures without any limiting character.

The following numbering is used throughout the figures, claims, and examples: frame (1); tensioning system (10); coupling element (20); canvas (50); zip (52); corner (54); canvas fastening element/zip guide (60); frame profile (100); central part (110); side wall (120); stop (125); guide (200); blocking wall (225); locking element (300); coupling means (310); blocking piece (320); tensioning means (400); fitting (500); lateral cover profile (510); central cover profile (520); frame element (530); hinge (540); fastening mechanism (550); elongated elements (560). The figures and numerical references are discussed in more detail in the examples.

FIG. 1 is a side view of a frame profile (100) of the tensioning system (10) described herein.

FIG. 2 is a side view of the tensioning system (10) described herein, further provided with two guides (200).

FIG. 3 is a side view of the tensioning system (10) described herein, further provided with a locking element (300) coupled to the frame profile (100) in a pushed-out position.

FIG. 4 is a side view of the tensioning system (10) described herein, further provided with a locking element (300) coupled to the frame profile (100) in a pushed-in position.

FIG. 5 is a side view of the tensioning system (10) described herein, further provided with a first tensioning means (400).

FIG. 6 is a side view of the tensioning system (10) described herein, further provided with a second tensioning means (400).

FIG. 7 is a side view of the tensioning system (10) described herein, wherein a first canvas (50) is fastened to the first guide (300) by means of a first canvas fastening element (60).

FIG. 8 is a side view of the tensioning system (10) described herein, wherein a second canvas (50) is fastened to the second guide (300) by means of a second canvas fastening element (60).

FIG. 9 is a side view of the tensioning system (10) described herein, wherein the two canvases (50) fastened to either side of the frame profile (100) are tensioned dynamically.

FIG. 14 is a perspective side view of a locking element (300) according to a first preferred embodiment.

FIG. 15 is a perspective front view of a locking element (300) according to a first preferred embodiment.

FIG. 16 is a perspective side view of the placement of a locking element (300) according to a first preferred embodiment.

FIG. 17 is a perspective side view of a locking element (300) according to a first embodiment in a pushed-out position.

FIG. 18 is a perspective side view of a locking element (300) according to a first preferred embodiment in a pushed-in position.

FIG. 19 is a perspective side view of the placement of a locking element (300) according to a second preferred embodiment.

FIG. 20 is a perspective side view of a locking element (300) according to a second preferred embodiment in a pushed-out position.

FIG. 21 is a perspective side view of a locking element (300) according to a second preferred embodiment in a pushed-in position.

FIG. 22 is a perspective side view of the placement of a locking element (300) according to a third preferred embodiment.

FIG. 23 is a perspective side view of a locking element (300) according to a third preferred embodiment in a pushed-out position.

FIG. 24 is a perspective side view of a locking element (300) according to a third preferred embodiment in a pushed-in position.

FIG. 25 is a side view of the tensioning system (10) described herein according to a second preferred embodiment in a pushed-out position.

FIG. 26 is a side view of the tensioning system (10) described herein according to a second preferred embodiment in a pushed-in position.

FIG. 27 is a side view of the tensioning system (10) described herein according to a third preferred embodiment.

FIG. 28 is a side view of the tensioning system (10) described herein according to a third preferred embodiment.

FIG. 29 is a side view of the tensioning system (10) described herein according to a fourth preferred embodiment.

FIG. 30 is a perspective side view of the tensioning system (10) described herein according to a fourth preferred embodiment.

DETAILED DESCRIPTION

Figure 1:
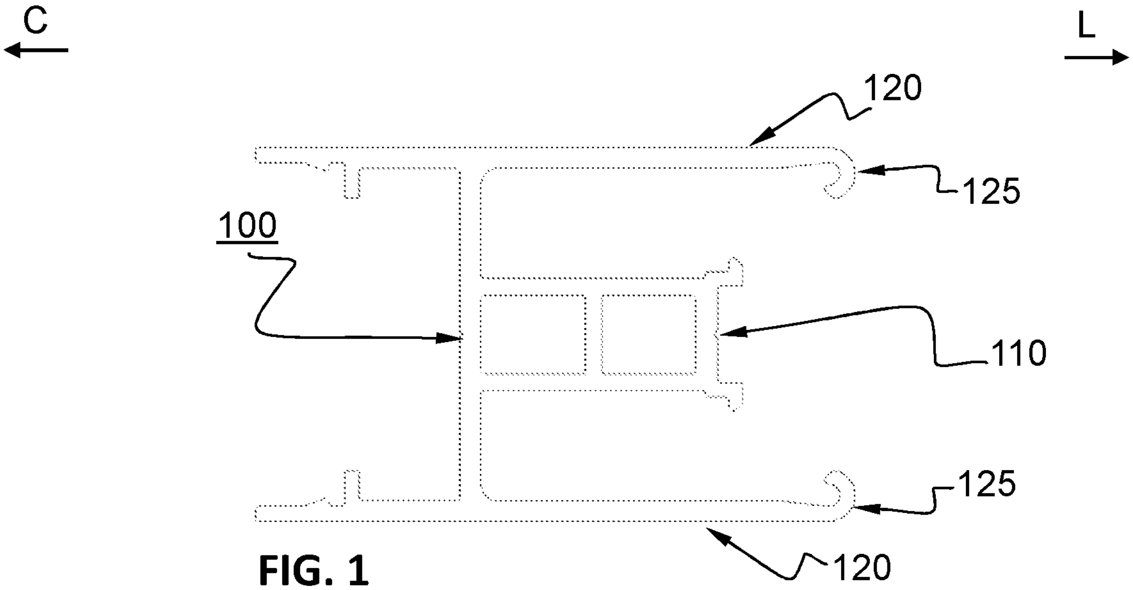
FIG. 1 to FIG. 9 show an operating principle for dynamic tensioning of two canvases (50) on either side of a frame by means of the tensioning system (10) described herein according to a first preferred embodiment thereof. These figures are discussed in more detail in Example 1.

Before describing the present system and method according to the invention, it must be understood that the present invention is not limited to specific systems and methods or combinations described, since such systems and methods and combinations may naturally vary. It should also be made clear that the terminology used herein is not intended to be limiting, since the scope of the present invention is only limited by the appended claims.

All documents cited in the present specification are incorporated herein in their entirety by reference.

As used hereinafter, singular forms "a", "an" etc. encompass both the singular and the plural unless clearly otherwise from the context.

The terms "comprise", "comprises" as used hereinafter are synonymous with "inclusive", "include" or "contain", "contains" and are inclusive or open and do not exclude additional parts, elements or steps of the method that are not stated. The terms "comprise", "comprises" include the term "contain".

The enumeration of numerical values by means of a range of figures comprises all values and fractions in this range, as well as the quoted end points.

The term "about", as used when referring to a measurable value such as a parameter, an amount, a duration, and so on, is intended to include variations of ±10% or less, preferably ±5% or less, more preferably ±1% or less, and even more preferably ±0.1% or less, of and from the specified value, insofar as the variations are applicable for functioning in the invention described herein. It should be understand that the value to which the term "about" refers per se was also made known.

Various aspects of the invention are defined in more detail in the following passages.

Each aspect thus defined may be combined with another aspect or aspects, unless the contrary is clearly stated. In particular, a feature indicated as "preferred" or "advantageous" may be combined with other features or properties that are stated as "preferred" and/or "advantageous". Reference in this specification to "one embodiment" or "an embodiment" signifies that a certain function, structure or feature described in connection with the embodiment is applicable in at least one embodiment of the present invention. When the phrases "in one embodiment" or "one embodiment" are stated at different points in this specification, they do not necessarily refer to the same embodiment, although this is not excluded. Moreover, the features, structures or characteristics described may be combined in any suitable way, as will be clear to a person skilled in the art on the basis of this description. The embodiments described and claimed in the claims may be used in every combination. In the present description of the invention, reference is made to the appended drawings, which form part thereof, and which illustrate specific embodiments of the invention. Numerals in parentheses or in bold linked to certain elements illustrate the respective elements as an example, without limiting the elements thereby. It must be understood that other embodiments may be used and structural or logical changes may be made while remaining within the scope of the present invention. The following detailed description is not to be regarded as limiting, and the scope of the present invention is defined by the appended claims. Unless defined otherwise, all terms used in the invention, including technical and scientific terms, have the meaning as usually understood by a person skilled in the art. As a further guide, definitions are given for further explanation of terms that are used in the description of the invention.

In order to meet the needs described above, the inventors developed methods and means for tensioning a canvas around a frame. In particular, the present invention relates to a single-sided or double-sided tensioning system for dynamic tensioning of a canvas respectively to one side or both sides of a frame. The single-sided tensioning system may thus allow dynamic tensioning of a canvas on one side of a frame, which typically forms the front wall. The double-sided tensioning system may allow dynamic tensioning of two canvases on either side of a frame, which typically form the front wall and rear wall.

The term "dynamic tensioning" refers to a feature of the tensioning system described herein for dynamically adjusting the tension on the canvas to the required resistance thereof. In particular, the tensioning system is configured in such a way that it can give when the canvas is pressed or touched, for example by being struck or in strong wind, but then will tension the canvas again. For comparison, in a static tensioning system according to the prior art a canvas is placed under a constant, static tension. This has the drawback that the canvas and the frame can easily be damaged and that over the course of time the canvas may form wrinkles.

The dynamic tensioning system described herein thus has the advantage that the canvas can be tensioned perfectly tightly and flat in a simple and user-friendly manner, even with limited experience in this field. Moreover, the dynamic tensioning system can ensure that the canvas can remain tensioned flat and tightly for longer, among other things by adjustment of the canvas tension over the course of time. This can provide a permanent solution for improving the life of a canvas.

The present tensioning system may also allow the canvas to be installed without making use of temporary joining means for keeping the canvas in position during installation, such as glue or silicone, and then tensioning the canvas without making use of permanent fasteners, such as nails, screws or hooks, or specially made tools for said application. In this way it is possible to avoid damaging the canvas during its installation and tensioning. The dynamic tensioning system may also be completely concealed for a more aesthetic looking finish of the frame. In particular, the edge of the frame and the mechanical components of the present tensioning system may be concealed under the canvas so that a more complete covering of the frame by the canvas becomes possible. Furthermore, the dynamic tensioning system may also provide easier dismounting of a canvas. In the present tensioning system the canvas may be unclamped without uncoupling it, which ensures that even in the unclamped state the canvas does not fall out. This may also allow dismounting of the canvas to take place more easily and more user-friendly. In particular when the dismounting of a single canvas is necessary with a double-sided frame.

A canvas, canvas or screen as used herein relates to a flexible medium that can be stretched over the frame. The canvas may be elastic or it may be partially pretensioned. Examples of suitable canvas material for the present invention are woven textile or a material consisting of plastic such as polyester, glass fiber, (fine) metal gauze, or other types of canvas material. The canvas may consist of several layers, for example to obtain improved darkening, or to improve the water resistance and/or wind resistance. The canvas may be provided with a print or decorative element. The canvas may comprise a zip, preferably provided on an edge of the canvas, which may be fastened to a zip guide in a known manner. This zip may for example form a thickening on an edge of the canvas. The canvas may for example be provided with a zip on opposite sides of the canvas or alternatively on each side of the canvas.

A frame or framework as used herein refers to a rigid structure for supporting the aforementioned canvas. The frame may be formed by a single continuous frame profile. However, it is simpler and cheaper to assemble a frame from several frame profiles. A typical frame consists substantially of four frame profiles, but a person skilled in the art will understand that this should not be interpreted as a limitation. The term "substantially" is to be interpreted as that the frame is only preferably assembled from four frame profiles, but in principle may be assembled from any number of frame profiles. These frame profiles may be coupled to one another by means of a coupling element, such as a strip or bracket. Alternatively the frame profiles may be a sliding fit in one another, wherein the frame profiles are provided with means for moving the adjacent frame profiles relative to each other.

The frame will typically have a central side and a lateral side. "Lateral" as used herein refers to the outward direction, i.e. from the center of the frame. The lateral direction is indicated with (L) in the appended figures. Equivalently, "central" as used herein refers to the inward direction, i.e. toward the center of the frame. The central direction is indicated with (C) in the appended figures. Depending on the position of the frame profile and the orientation of the frame, the lateral and central direction may be upward, downward or sideways (for example to the left or right).

The frame profiles are preferably arranged so that the frame approximately forms a quadrilateral or rectangle. The term "approximately" should be interpreted as being that the frame is very close to the geometric shape referred to; that is, apart from any roundings, projections, coupling elements, grooves, slots, ribs, openings, connecting pieces, strengthening means, etc. For further explanation, reference should be made to the figures.

A frame profile is typically manufactured from a rigid material. This may for example be aluminum. Aluminum has many advantages as a profile material, namely it is robust, durable, and light. Other profile materials are, however, also suitable and the properties thereof are assumed to be known by a person skilled in the art. A frame profile may, depending on the desired configuration, be provided with a particular finish, for example a smooth or a rough surface.

Preferably the frame profiles, which form part of the frame, are arranged so that their outline delimits the outer edge of the frame. There may be countless variations of the dimensions of the frame and, by extension, of the dimensions of frame profiles; ranging from, by way of an example, 0.1 m to 3.0 m per side; for example 1.0 m, for example 1.5 m, for example 2.0 m, for example 2.5 m, and so on.

One aspect of the present invention relates to a single-sided tensioning system for dynamic tensioning of a canvas to a side of a frame, which is assembled substantially from four or more frame profiles, the tensioning system comprising: a frame profile comprising a back wall with an upright central part and two upright side walls, which extend in the lateral direction of the frame; wherein the frame profile is provided with at least one stop; a guide provided with a means for fastening the canvas; wherein the guide is mounted movably in the frame profile between the central part and a side wall; a locking element comprising a coupling means and a blocking piece; wherein the coupling means is configured for coupling the locking element to the central part; a tensioning means for tensioning the canvas fastened to the guide; wherein the tensioning means is tensioned between the stop and the guide so that it can tension this guide in the central direction of the frame and the blocking piece is arranged so that it can block a movement of this guide; and/or the tensioning means is tensioned between the blocking piece and the guide so that it can tension this guide in the central direction of the frame and the stop is arranged so that it can block a movement of this guide; wherein a displacement of the locking element and/or blocking piece relative to the frame profile stretches the canvas fastened to the guide over a side wall of the frame profile.

In a preferred embodiment, the locking element is a sliding fit in the central part and is provided with a coupling means for coupling the locking element in at least two positions to the central part, preferably a pushed-in and a pushed-out position; wherein a displacement of the locking element and/or blocking piece from a pushed-in to a pushed-out position or from a pushed-out to a pushed-in position stretches the canvas fastened to the guide over a side wall of the frame profile.

In a preferred embodiment at least one side wall of the frame profile can be provided with an inward-directed stop, preferably at one end thereof, so that the tensioning means is tensioned between this stop and the guide.

In a preferred embodiment the central part of the frame profile can be provided with at least one outward-directed stop, preferably at one end thereof, so that the tensioning means is tensioned between this stop and the guide.

In a preferred embodiment the tensioning system may comprise a stop profile that can be coupled to the frame profile, preferably to the central part of the frame profile; wherein the stop profile, on coupling, forms at least one stop so that the tensioning means is tensioned between this stop and the guide.

In a preferred embodiment the blocking piece of the locking element is arranged so that it can block a movement of the guide in the central direction of the frame. This embodiment is especially suitable for an embodiment wherein the locking element is a sliding fit in the central part along a central side of the frame profile, preferably along an opening provided in the back wall of the frame profile.

In a preferred embodiment the blocking piece of the locking element is arranged so that it can block a movement of the guide in the lateral direction of the frame. This embodiment is especially suitable for an embodiment wherein the locking element is a sliding fit in the central part along a lateral side of the frame profile, preferably along an opening provided in the central part of the frame profile.

In a preferred embodiment the stop of the frame profile is arranged so that it can block a movement of the guide in the lateral direction of the frame. This embodiment is especially suitable for an embodiment wherein the locking element is a sliding fit in the central part along a lateral side of the frame profile, preferably along an opening provided in the central part of the frame profile.

In a preferred embodiment, the locking element is a sliding fit in the central part and is provided with a coupling means for coupling the locking element in at least two positions to the central part, preferably a pushed-in and a pushed-out position; wherein a displacement of the locking element and/or blocking piece from a pushed-in to a pushed-out position or from a pushed-out to a pushed-in position stretches the canvas fastened to the guide over a side wall of the frame profile.

One aspect of the present invention relates to a double-sided tensioning system for dynamic tensioning of two canvases on either side of a frame, which is assembled substantially from four or more frame profiles, the tensioning system comprising: a frame profile comprising a back wall with an upright central part and two upright side walls, which extend in the lateral direction of the frame; wherein the frame profile is provided with at least two stops on either side; at least two guides, each provided with a means for fastening a different canvas; wherein each guide is mounted movably in the frame profile between the central part and a different side wall; a locking element comprising a coupling means and at least two blocking pieces provided on either side of the locking element; wherein the coupling means is configured for coupling the locking element to the central part; at least two tensioning means for tensioning the canvases fastened to the guides; wherein the tensioning means are tensioned between a different stop and guide so that they can tension these guides in the central direction of the frame and the blocking pieces are arranged so that they can block a movement of these guides and/or the tensioning means are tensioned between a different blocking piece and guide so that they can tension these guides in the central direction of the frame and the stops are arranged so that they can block a movement of this guide; wherein a displacement of the locking element and/or the blocking pieces relative to the frame profile tensions the canvases fastened to the different guides over different side walls of the frame profile.

In a preferred embodiment, the different blocking pieces of the locking element are arranged so that they can block a movement of the different guides in the central direction of the frame. This embodiment is especially suitable for an embodiment wherein the locking element is a sliding fit in the central part along a central side of the frame profile, preferably along an opening provided in the back wall of the frame profile. In a preferred embodiment, the different blocking pieces of the locking element are arranged so that they can block a movement of the different guides in the lateral direction of the frame. This embodiment is especially suitable for an embodiment wherein the locking element is a sliding fit in the central part along a lateral side of the frame profile, preferably along an opening provided in the central part of the frame profile.

In a preferred embodiment, the different stops of the frame profile are arranged so that they can block a movement of the different guides in the lateral direction of the frame. This embodiment is especially suitable for an embodiment wherein the locking element is a sliding fit in the central part along a lateral side of the frame profile, preferably along an opening provided in the central part of the frame profile.

In a preferred embodiment, at least each side wall of the frame profile may be provided with a stop, preferably at one end thereof, so that each of the two tensioning means is tensioned between a different stop and guide.

In a preferred embodiment, the central part of the frame profile may be provided on either side with at least two outward-directed stops, preferably at one end thereof, so that each of the two tensioning means is tensioned between a different stop and guide. In a preferred embodiment, the tensioning system may comprise a stop profile that can be coupled to the frame profile, preferably to the central part of the frame profile; wherein the stop profile, on coupling, forms at least two stops on either side so that each of the two tensioning means is tensioned between a different stop and guide.

In a preferred embodiment, the locking element is a sliding fit in the central part and is provided with a coupling means for coupling the locking element in at least two positions to the central part, preferably a pushed-in and a pushed-out position; wherein a displacement of the locking element and/or blocking piece from a pushed-in to a pushed-out position or from a pushed-out to a pushed-in position stretches the canvases fastened to the different guides over different side walls of the frame profile. The components of the dynamic single-sided and/or double-sided tensioning system described herein are explained in more detail hereunder, and preferred embodiments thereof are also described, the purpose of which is to further improve the efficiency and user-friendliness of the tensioning systems. However, a person skilled in the art will understand that certain components of the tensioning system are compatible or combinable without loss of function. The components are mainly described as being separate because the inventors have found that this simplifies the production and installation of the tensioning systems and consequently also of the frame.

A person skilled in the art will understand that the above-described embodiments of one or more stops provided for the single-sided and/or double-sided tensioning system only represent preferred examples without any limiting character for the present invention. The inventors have discovered that these embodiments have various advantages for the user-friendliness of the tensioning system, but a person skilled in the art will understand that other embodiments are also possible for providing a suitable stop in a tensioning system of this kind. For further explanation, reference should be made to the figures and examples included herein.

The frame profile comprises at least one back wall, which is provided with at least one upright side wall and an upright central part. Here, the term "upright" indicates that this structure is upright relative to the structure referred to, preferably perpendicular thereto. In a preferred embodiment the upright structures are perpendicular to the back wall. Alternatively a slight inward or outward slope may be provided between the back wall and the upright structures. The frame profile is arranged so that the upright structures will extend in the lateral direction of the frame. The components of the frame profile preferably form a whole. They may for example be co-extruded during production of the frame profile. Alternatively the components may be fixed to each other, for example by means of a fastening element.

The side walls may form a space that is suitable for receiving the components of the tensioning system described hereunder. In a preferred embodiment the frame profile comprises at least two upright side walls. The side walls may extend in the lateral direction of the frame. In an embodiment in which the frame profile comprises two upright side walls, this space may be U-shaped or a variant thereof, such as V-shaped. Alternatively the frame profile may comprise at least four upright side walls, which extend in opposite directions. In an embodiment in which the frame profile comprises four upright side walls, this space may be H-shaped or a variant thereof. The side walls may extend in the central and lateral direction of the frame.

The side wall may form a structure for tensioning the canvas over, i.e. as a tensioning wall. The end of the side wall may be provided with suitable shapes for adapting the contact with the canvas. The end may for example be partially rounded in order to reduce the friction between the wall and the canvas. Alternatively it may be ribbed in order to increase the friction between the tensioning wall and the canvas. Preferably the end of the tensioning wall is partly or completely spherical. In a preferred embodiment the end of a side wall may be rounded-off on the lateral side.

The side wall may further be provided with at least one stop. This stop may be arranged so that it can block a movement of a guide in at least one direction, for example in the central direction of the frame and/or in the lateral direction of the frame. Alternatively or additionally this stop may be arranged so that a tensioning means can be tensioned between this stop and a guide so that a tensioning means is tensioned partially or completely. In one embodiment the stop of the side wall may be "inward-directed", i.e. toward the central part of the frame profile. An inward-directed stop may typically be provided on one end of a side wall. This embodiment makes it possible for example to secure a tensioning means on an outer side of the frame profile.

The stop of the side wall may be provided with suitable shapes to match the contact with the tensioning means. The end may for example be provided with a recess, in which the tensioning means may be placed, so that it cannot move during installation or jump out of it when pressure is exerted on the canvas. In a preferred embodiment the stop of a side wall may be rounded-off on the lateral side and be provided on the central side with a recess for inserting the tensioning means.

The stop of the side wall may also be configured for mechanically blocking movement of a guide in at least one direction, for example in a lateral direction of the frame. This embodiment makes it possible for example to secure a tensioning means by means of the locking element described hereunder.

The central part may form a partition between a first space, formed between a first side wall and a side of the central part, and a second space, formed between a second side wall and another side of the central part. Preferably the central part may be positioned halfway along the back wall, i.e. in the middle thereof, so that the frame profile is divided into two identical and symmetrical parts. The central part may comprise several upright partition walls, for example two upright partition walls. These partition walls may be joined together, to increase the rigidity of the frame profile. For example a bridge structure may be formed, wherein the sides of the adjacent partition walls are joined together at a distance from the back wall.

The central part may form a space for at least partially receiving a locking element. In a preferred embodiment, the locking element is a sliding fit in the central part. For this purpose, the central part may be provided with means for improving or guiding the sliding of the locking element, such as grooves. In a preferred embodiment the back wall of the frame profile may be provided with an opening under the central part so that the locking element can be placed or pushed-in along this opening in the central part.

In a preferred embodiment, the back wall of the frame profile is provided with an opening under the central part so that the locking element placed along this opening in the central part can preferably be pushed-in in the lateral direction of the frame. In a preferred embodiment, the central part of the frame profile is provided with an opening so that the locking element placed along this opening in the central part can preferably be pushed-in in the central direction of the frame.

The central part may further be provided with at least one stop. This stop may be arranged so that it can block a movement of a guide in at least one direction, for example in the central direction of the frame and/or in the lateral direction of the frame. Alternatively or additionally this stop may be arranged so that a tensioning means can be tensioned between this stop and a guide so that a tensioning means is tensioned partially or completely.

In one embodiment, the stop of the central part may be "outward-directed", i.e. toward a side wall of the frame profile. An outward-directed stop may typically be provided on one end of the central part. This embodiment makes it possible for example to secure a tensioning means on an inner side of the frame profile.

The stop of the central part may be provided with suitable shapes to match the contact with the tensioning means. The end may for example be provided with a recess, in which the tensioning means may be placed, so that it cannot move during installation or spring out of it when pressure is exerted on the canvas. In a preferred embodiment, the stop of a side wall may be rounded-off on the lateral side and be provided on the central side with a recess for inserting the tensioning means.

The central part may form a structure for coupling a fitting or cover profile. In particular, the central part may be provided with couplable structures provided for coupling a fitting or cover profile. In a preferred embodiment, the central part may be provided with hookable structures on which a fitting or cover profile can hook. Alternatively, the central part itself may be provided with hooks, which are adapted for hooking on the fitting or cover profile. A person skilled in the art is assumed to be capable of suitably adapting the end of the central part for coupling to other structures.

The tensioning system may optionally comprise a stop profile that forms a stop for securing the tensioning means partially or completely. The stop profile may be couplable to a component of the frame profile, such as a central part or a side wall. The provision of a separate stop profile may allow the canvas to be tensioned only after mounting the frame. This may for example be advantageous if the complete frame together with the canvas is installed beforehand.

The tensioning system comprises a guide that is adapted for fastening the canvas. The guide may be provided with a means for fastening the canvas, such as a clamp. Alternatively the guide may be fastened to the canvas directly. The canvas may be fastened inseparably to the guide, for example by means of glue or a fastening element such as a nail. Preferably the canvas can be detached from the guide so that it can be replaced without dismounting the guide.

The guide may further comprise a canvas fastening element, wherein the canvas is provided with a thickening, which can be placed in the canvas fastening element. In a preferred embodiment the guide may comprise a zip guide, wherein the canvas is provided with a zip, which can be placed in the zip guide. The canvas fastening element, preferably the zip guide, may for example be provided with an opening for inserting or pushing-in a part of the canvas, such as the zip. The canvas fastening element, preferably the zip guide, may be adapted for partially enlarging this opening during insertion or pushing-in of the canvas, preferably the zip, for example by making the canvas fastening element partially flexible.

In a preferred embodiment, the canvas fastening element, preferably the zip guide, is a separate component that is a sliding fit in the aforementioned guide. This allows the canvas, preferably by means of the zip, to be fastened beforehand to the canvas fastening element so that placing of the canvas in the guide becomes simpler and more user-friendly. The inventors have found that this provides an especially efficient embodiment for fastening of canvases that are provided with several zips, for example on either side or on each side of the canvas. Fastening of the canvas to several sides of the frame is typically a difficult operation because the guide will already be under partial tension by the tensioning means. By providing a separate, slidable canvas fastening element, preferably in the form of a zip guide, the canvas may be blocked completely, preferably by the zip, so that the canvas has nowhere else to go and the fastening of the canvas on several sides of the frame nevertheless becomes possible.

The guide may be placed movably between a side wall and a central part of the frame profile. “Movably” means that the guide is not coupled or secured to the frame profile, so that it can move in at least two directions, in particular in the central and the lateral direction of the frame. The movement of the guide will be determined by on the one hand the locking element and on the other hand the tensioning means. In particular, the tensioning means can tension the guide in the central direction of the frame, but a blocking piece provided on the locking element can block a movement of the guide in this central direction of the frame. In this way, the position of the guide can be adapted at any time so that the canvas can be tensioned dynamically along one or two sides of the frame. For further explanation, reference should be made to the figures and examples included herein.

The length of the guide may match the length of an adjacent side wall or an edge of the canvas. Alternatively the guide may have a limited length, for example half the length of the frame or canvas, for example a quarter of the length, for example a fraction of the length. Several guides may be placed next to each other with a preferably regular spacing from one another. The dimensions of the guide are preferably adapted to the space for receiving the guide in the frame profile: the guide is preferably small enough to be placed in the frame profile without resistance, so that it can move freely in the central and lateral direction, but large enough to be tensioned in the frame profile between a side wall and central part, so that it cannot move sideways.

The guide may further be provided with a sideways-projecting blocking wall with an end that is adapted for contact with the stop of the frame profile. The stop can then block movement of the guide block in the lateral direction of the frame. The blocking wall can thus prevent the guide being pulled out of the frame profile during mounting or untensioning of a canvas.

The guide may further be provided with a recess or groove for inserting the tensioning means. In a preferred embodiment this recess is arranged so that the tensioning means remains tensioned in place when a pressure is exerted on the canvas, such as a blow or strong wind. The recess is preferably rounded so that the tensioning means cannot slip out of the recess. The recess may be ribbed to increase the friction between the tensioning means and the recess. Alternatively the guide may be coupled to the tensioning means.

The tensioning system comprises a tensioning means that is adapted for tensioning the guide in the central direction of the frame. For this purpose the tensioning means may be tensioned between the guide and the frame profile. A plurality of tensioning means may also be provided that are placed next to each other and thus together tension the guide. This may allow the desired tensioning force to be adapted in a modular fashion. The surface that is covered by the tensioning means preferably matches the length of the adjacent guide. If a plurality of guides are placed next to each other, several tensioning means may also be provided; for example one tensioning means per guide. Alternatively a lengthened tensioning means may be provided, which runs along the plurality of guides. Alternatively a plurality of shorter tensioning means may also be provided, which are placed behind one another.

The height of the tensioning means may be adapted depending on the required intensity of the load, for example for strong or weak wind load or for a heavy or light screening canvas. The height of the tensioning means may also be adapted to the length of the adjacent side wall of the frame profile.

The tensioning means may be made from a material that is able to return to its original shape after being bent, stretched or compressed. The tensioning means may comprise or consist of an elastic material and/or a spring material. The resilience of the tensioning means may be adapted depending on the intensity of the load, for example for strong or weak wind load or for a heavy or light screening canvas. Depending on the choice of material, the tensioning means may be more stiff or rigid, or may be more flexible and elastic. A person skilled in the art is assumed to understand how the choice of material can affect the resilience of the tensioning means.

In a preferred embodiment, the tensioning means may comprise an arch-shaped spring or a plurality of arch-shaped springs. An arched shape makes it easy for the length of the tensioning means to match the length of the adjacent locking element. An example of an arched shape is a semicircle or a half-ellipse, or it may also have an irregular curve.

Preferably the arch-shaped spring may be arranged so that the top thereof is in contact with the tensioning profile and the ends are in contact with the guide, or conversely, the top is in contact with the guide and the ends are in contact with the tensioning profile. In a preferred embodiment, the tensioning means may comprise a wavy spring or a plurality of wavy springs. An example of a wavy shape is sinusoidal. The length of the wavy spring may coincide with one or more waves, for example two or three waves. Preferably the wavy spring may be arranged so that the crest or crests thereof are in contact with the tensioning profile and the valley or valleys are in contact with the guide, or conversely, the crest or crests are in contact with the guide and the valley or valleys are in contact with the tensioning profile. It is clear that further alternative embodiments of the tensioning means are possible, wherein the tensioning means preferably comprises one or more elastic and/or spring elements that are fitted and function in a similar manner, as described above.

The tensioning system comprises a locking element that is couplable to the frame profile, in particular the central part of the frame profile. In a preferred embodiment the locking element is provided with a coupling means that is configured for coupling the locking element in at least two positions to the central part, for example a pushed-in and a pushed-out position. Alternatively the locking element may be provided with several coupling means, wherein each coupling means is configured for coupling the locking element to the central part in a different position. The provision of several coupling positions or coupling means may give more control of the maximum degree of tension when mounting or dismounting a fastened canvas.

The locking element further comprises at least one blocking piece. The blocking piece may be arranged so that it can block a movement of a guide in at least one direction, for example in the central direction of the frame and/or in the lateral direction of the frame. The blocking piece may for example form a stop that can block the movement of the guide.

Alternatively or additionally, the blocking piece may be arranged so that it can tension a tensioning means partially or completely. The blocking piece may for example form a stop so that a tensioning means can be tensioned between the blocking piece and a guide. The locking element typically comprises a body, on which at least one and preferably at least two blocking pieces are provided, which project from the body.

In a preferred embodiment the blocking piece may comprise at least one sideways projecting wing or more preferably may comprise, on either side, at least two sideways projecting wings, i.e. a wing-shaped structure that projects sideways from the body of the locking element, one end of which forms a blocking piece.

In a preferred embodiment the blocking piece may comprise at least one sideways projecting circle, i.e. a circular end that projects sideways around the body of the locking element so that a portion of this end forms one or more blocking pieces. A person skilled in the art will understand that the circular end may also be an arch-shaped or elliptical end.

In a preferred embodiment the blocking piece may comprise an elongated nut, i.e. a rectangular nut, at least one end of which projects sideways from the body of the locking element so that a portion of this end forms one or more blocking pieces.

The blocking piece may be provided with an end that is adapted for contact with the guide, which forms a stopper for an adjacent guide. The end may be a flattened end. The end may also be provided with a finish to improve contact with the guide, for example a groove that is suitable for partially receiving the guide. In a preferred embodiment the locking element is provided on either side with two blocking pieces. These blocking pieces may form equivalent wing pieces that project sideways in opposite directions from the body of the locking element.

The locking element may be introduced into the frame profile. In particular, the locking element may be a sliding fit in the central part, so that it is slidable relative to the frame profile in at least the central and lateral direction of the frame. This displacement allows the position of the locking element to be adapted between at least two different positions, for example a pushed-in position and a pushed-out position. It is understood that the provision of several positions may offer advantages for the adaptability of the tensioning system, for example to limit the resilience of the tensioning means. The inventors have found that the provision of at least two positions is an especially efficient embodiment of the present invention.

The locking element may be coupled to the frame profile by means of coupling means. In a preferred embodiment the coupling means may be configured to couple the locking element in one of the at least two positions. In particular, the locking element may be provided with a coupling means that is adapted for coupling to the frame profile, or the frame profile may be provided with a coupling means for coupling the locking element, or both the locking element and the frame profile may be provided with complementary elements that may be coupled together.

The coupling means is preferably configured for repeatable coupling so that the locking element may be coupled repeatably and uncoupled repeatably. This may allow the position of the locking element to be adjusted easily. The coupling means may be provided with snap-fit elements, i.e. for a snap-fit coupling. The coupling means may be provided with screwable elements, i.e. for a screwable coupling.

In a preferred embodiment the coupling means is provided with at least one, preferably two or more impressible projections, wherein each projection is provided with a hooking point. The hooking point may be inward-directed of outward-directed, but is preferably outward-directed. The hooking point may for example be secured to a hooking-in point provided in the frame profile and in particular in the central part. This hooking-in point may for example be an opening provided in an upright wall of the central part. Preferably this hooking-in point may be provided in the transverse direction of the frame, so that the hooking point cannot come into contact with the guide and possibly block the latter. The hooking points are preferably arranged so that the locking element can be uncoupled by pressing-in the two impressible projections. A person skilled in the art will understand that a similar effect may also be obtained with several impressible projections, for example four projections, but the inventors have found that two projections form an especially efficient embodiment without unnecessary complexity.

In a preferred embodiment, the locking element and in particular the impressible projection thereof are provided with a sloping end face. The sloping end face may allow the projection to be pushed in by a displacement of the locking element in the lateral direction of the frame. The sloping end face may then come into contact with a partition wall of the central part, so that the projection will gradually be pushed in. The sloping end face may be inward-directed of outward-directed, but is preferably outward-directed. To this end, the distance between the impressible projections may be greater than the distance between the partition walls of the central part.

In a preferred embodiment, the coupling means is provided with a screw, which may be placed in the frame profile, preferably the central part. The locking element may then be coupled by fastening a nut to an end of this screw. The head of the screw may be provided on the lateral side of the central part so that it can be screwed on easily. The nut may be provided with an elongated body, the ends of which form blocking pieces. An embodiment of this kind may allow the locking element or blocking piece to be coupled in a plurality of positions, which may allow the maximum and minimum tension on the canvas to be adapted dynamically. A person skilled in the art will understand that a similar effect may also be obtained with projections with several screws and/or nuts, but the inventors have found that one screw with an elongated nut is an especially efficient embodiment without unnecessary complexity.

The tensioning system may further comprise a cover profile, which is adapted for covering the tensioning system. The cover profile may be coupled to the frame profile and particularly to the central part thereof. In particular, the cover profile may be provided with a coupling means that is adapted for coupling to the frame profile, or the frame profile may be provided with a coupling means for coupling the cover profile, or both the cover profile and the frame profile may be provided with complementary elements that may be coupled together. This coupling may preferably be undone repeatably, so that the cover profile can be uncoupled easily when dismounting the tensioning system.

The cover profile may form a side wall of the frame. This has the advantage that the components of the tensioning system are screened, as well as completely hidden from view. In a preferred embodiment the cover profile may, during coupling, form an aligned plane with the end or ends of the upright wall or walls of the frame profile to form an inserted cover profile. In a preferred embodiment the cover profile may, during coupling, be arranged over the end or ends of the upright wall or walls of the frame profile to form a surface-mounted cover profile. Alternatively the cover profile may form a groove between the upright walls of the frame profile, in which additional finishing elements may be provided, such as wheels, lighting (for example an LED), decorative elements, and so on.

The cover profile may be coupled to the lateral side of the frame to form a lateral cover profile, which forms a side wall of the frame on coupling to the frame profile. A lateral cover profile is especially suitable for concealing the components of the tensioning system for both a single-sided and a double-sided tensioning system. The cover profile may be coupled to the central side of the frame to form a central cover profile, which forms a central wall of the frame on coupling to the frame profile. A central cover profile is especially suitable for concealing the components of the tensioning system at the back of a single-sided tensioning system, but may also be used for a double-sided tensioning system.

In a preferred embodiment, the cover profile comprises a back wall with two upright walk. The length of the back wall may match the distance between the upright walls of the frame profile so that the canvas can be covered partially, or it may be shortened in order to avoid contact with the canvas. The at least two upright walls are preferably not positioned at the ends of the back wall, so that they can be placed fully in the frame profile. The upright walls may for example be provided half way to the middle of the back wall. The ends of the at least two upright walls may comprise a hook-shaped structure, which can be coupled to the frame profile and particularly the central part thereof, for example because they are firmly hooked on or along it.

The tensioning system may further comprise a fitting, which is configured for coupling one or more frame elements. The frame elements may for example comprise a rail, a roller, a stopper, a lock, a hinge, a frame guide, and so on. A person skilled in the art will understand that the present invention is not limited to a particular frame element. The fitting may also be configured for coupling the cover profile described above, such as an inserted or surface-mounted cover profile.

One aspect of the present invention relates to a single-sided canvas frame, comprising a frame provided with the single-sided tensioning system described herein and a canvas, wherein the canvas is tensioned dynamically to a side of the frame. It is to be understood that preferred embodiments of the single-sided tensioning system as described herein also form preferred embodiments of the single-sided canvas frame.

One aspect of the present invention relates to a double-sided canvas frame, comprising a frame provided with the double-sided tensioning system described herein and two canvases, wherein the canvases are tensioned dynamically to either side of the frame.

It is to be understood that preferred embodiments of the double-sided tensioning system as described herein also form preferred embodiments of the double-sided canvas frame.

One aspect of the present invention relates to a use of the single-sided tensioning system described herein for tensioning a canvas to one side of a frame. It is to be understood that preferred embodiments of the single-sided tensioning system as described herein also form preferred embodiments of the use of the single-sided tensioning system.

One aspect of the present invention relates to a use of the single-sided canvas frame described herein as a roof, partition, wall, door or closure, or alternatively as a panel in a roof, partition, wall, door or closure.

One aspect of the present invention relates to a use of the double-sided tensioning system described herein for tensioning a canvas on either side of a frame. It is to be understood that preferred embodiments of the double-sided tensioning system as described herein also form preferred embodiments of the use of the double-sided tensioning system.

One aspect of the present invention relates to a use of the double-sided canvas frame described herein as a roof, partition, wall, door or closure, or alternatively as a panel in a roof, partition, wall, door or closure.

In a further aspect, the invention relates to a method for the dynamic tensioning of a canvas to one side of a frame. It is to be understood that preferred embodiments of the single-sided tensioning system as described herein also form preferred embodiments of the method.

In a first preferred embodiment, the method comprises:

(a) providing a frame profile;
(b) placing a guide in the frame profile between a central part and a side wall of the frame profile;
(c) providing a locking element;
(d) optionally, coupling the locking element to the central part of the frame profile;
(e) tensioning a tensioning means between on the one hand a stop of the frame profile and/or a blocking piece of the locking element and on the other hand the guide;
(f) fastening the canvas to the guide, wherein the canvas is folded over the side wall of the frame profile;
(g) optionally, uncoupling the locking element from the central part;
(h) moving the locking element so that the canvas is stretched over the side wall of the frame profile; and,
(i) optionally, coupling the locking element to the central part of the frame profile;

In a preferred embodiment, the method comprises at least one of steps (d)+(h) and/or step (i).

In a preferred embodiment, the method comprises:

(c) at least partially inserting the locking element in the central part of the frame profile;
(d) coupling the locking element to the central part in a first position, wherein the first position coincides with a pushed-in position of the locking element; and,
(i) coupling the locking element to the central part in a second position, wherein the second position coincides with a pushed-out position of the locking element.

In a preferred embodiment, the method comprises:

(c) optionally, at least partially inserting the locking element in the central part of the frame profile;

(d) coupling the locking element to the central part in a first position, wherein the first position coincides with a pushed-out position of the locking element; and, (i) coupling the locking element to the central part in a second position, wherein the second position coincides with a pushed-in position of the locking element.

In a second preferred embodiment, the method comprises:

(a) providing a frame profile comprising a central part and a side wall;

(b) placing a guide in the frame profile between the central part and the side wall;

(c) inserting a locking element in the central part of the frame profile;

(d) pushing-in the locking element in the lateral direction of the frame, so that a blocking piece of the locking element comes into contact with the guide;

(e) coupling the locking element to the central part of the frame profile in a first position, wherein the first position coincides with a pushed-in position of the locking element;

(f) tensioning a tensioning means between a stop of the side wall and the guide;

(g) fastening the canvas to the guide, wherein the canvas is folded over the side wall of the frame profile;

(h) uncoupling the locking element from the central part of the frame profile;

(i) sliding-out the locking element in the central direction of the frame, so that the canvas is stretched over the side wall of the frame profile;

(j) coupling the locking element to the central part of the frame profile in a second position, wherein the second position coincides with a pushed-out position of the locking element;

(k) optionally, coupling a central cover profile to the frame profile to form a central wall of the frame, (l) optionally, coupling a lateral cover profile to the frame profile to form a side wall of the frame, and/or coupling a fitting to the frame profile, which is configured for coupling one or more frame elements and/or the lateral cover profile.

In a further aspect, the invention relates to a method for the dynamic tensioning of two canvases on either side of a frame. It is to be understood that preferred embodiments of the double-sided tensioning system as described herein also form preferred embodiments of the method.

In a first preferred embodiment, the method comprises:

(A) providing a frame profile;

(B) placing a first guide in the frame profile between a central part and a first side wall thereof and placing a second guide in the frame profile between a central part and a second side wall thereof;

(C) providing a locking element;

(D) optionally, coupling the locking element to the central part;

(E) tensioning a first tensioning means between on the one hand a first stop and/or first blocking piece and on the other hand the first guide and tensioning a second tensioning means between on the one hand a second stop and/or second blocking piece and on the other hand the second guide;

(F) fastening the first canvas to the first guide, wherein the first canvas is folded over the first side wall of the frame profile, and fastening the second canvas to the second guide, wherein the second canvas is folded over the second side wall of the frame profile;

(G) optionally, uncoupling the locking element from the central part;

(H) moving the locking element so that the first canvas is stretched over the first side wall of the frame profile and the second canvas is stretched over the second side wall of the frame profile (100); and, (I) optionally, coupling the locking element to the central part.

In a preferred embodiment, the method comprises at least one of steps (D)+(H) and/or step (I).

In a preferred embodiment, the method comprises:

(C) at least partially inserting the locking element in the central part of the frame profile; (D) coupling the locking element to the central part in a first position, wherein the first position coincides with a pushed-in position of the locking element; and, (I) coupling the locking element to the central part in a second position, wherein the second position coincides with a pushed-out position of the locking element.

In a preferred embodiment, the method comprises:

(C) optionally, at least partially inserting the locking element in the central part of the frame profile;

(D) coupling the locking element to the central part in a first position, wherein the first position coincides with a pushed-out position of the locking element; and, (I) coupling the locking element to the central part in a second position, wherein the second position coincides with a pushed-in position of the locking element.

In a second preferred embodiment, the method comprises:

(A) providing a frame profile comprising a central part and two side walls;

(B) placing a first guide in the frame profile between the central part and a first side wall, and placing a second guide in the frame profile between the central part and a second side wall;

(C) inserting a locking element in the central part of the frame profile;

(D) pushing-in the locking element in the lateral direction of the frame, so that a first blocking piece of the locking element comes into contact with the first guides and a second blocking piece comes into contact with the second guide;

(E) coupling the locking element to the central part of the frame profile in a first position, wherein the first position coincides with a pushed-in position of the locking element;

(F) tensioning a first tensioning means between a stop of the first side wall and the first guide, and tensioning a second tensioning means between a stop of the second side wall and the second guide;

(G) fastening the first canvas to the first guide, wherein the first canvas is folded over the first side wall of the frame profile, and fastening the second canvas to the second guide, wherein the second canvas is folded over the second side wall of the frame profile;

(H) uncoupling the locking element from the central part of the frame profile;

(I) sliding-out the locking element in the central direction of the frame, so that the first canvas is stretched over the first side wall of the frame profile and the second canvas is stretched over the second side wall of the frame profile;

(J) coupling the locking element to the central part of the frame profile in a second position, wherein the second position coincides with a pushed-out position of the locking element.

(K) optionally, coupling a central cover profile to the frame profile to form a central wall of the frame;

(L) optionally, coupling a lateral cover profile to the frame profile to form a side wall of the frame, and/or coupling a fitting to the frame profile, which is configured for coupling one or more frame elements and/or the lateral cover profile.

In a further aspect, the invention relates to a method for dynamic untensioning and optional detachment of the canvas. It is to be understood that the canvas was preferably dynamically tensioned according to a method as described herein. In a preferred embodiment the method further comprises the following steps:

(i) uncoupling the locking element from the central part;
(ii) pushing-in the locking element in the lateral direction of the frame, so that the canvas is slackened over the side wall of the frame profile;
(iii) coupling the locking element to the central part in a first position, wherein the first position coincides with a pushed-in position of the locking element; and,
(iv) optionally, detaching the canvas from the guide.

EXAMPLES

With the aim of better illustrating the features of the invention, some preferred embodiments are described hereunder, as examples without any limiting character, referring to the appended figures. The embodiments illustrated in the figures relate to preferred embodiments of the present invention and should not in any way be interpreted as a limitation.

Example 1: Tensioning System

Figure 13:
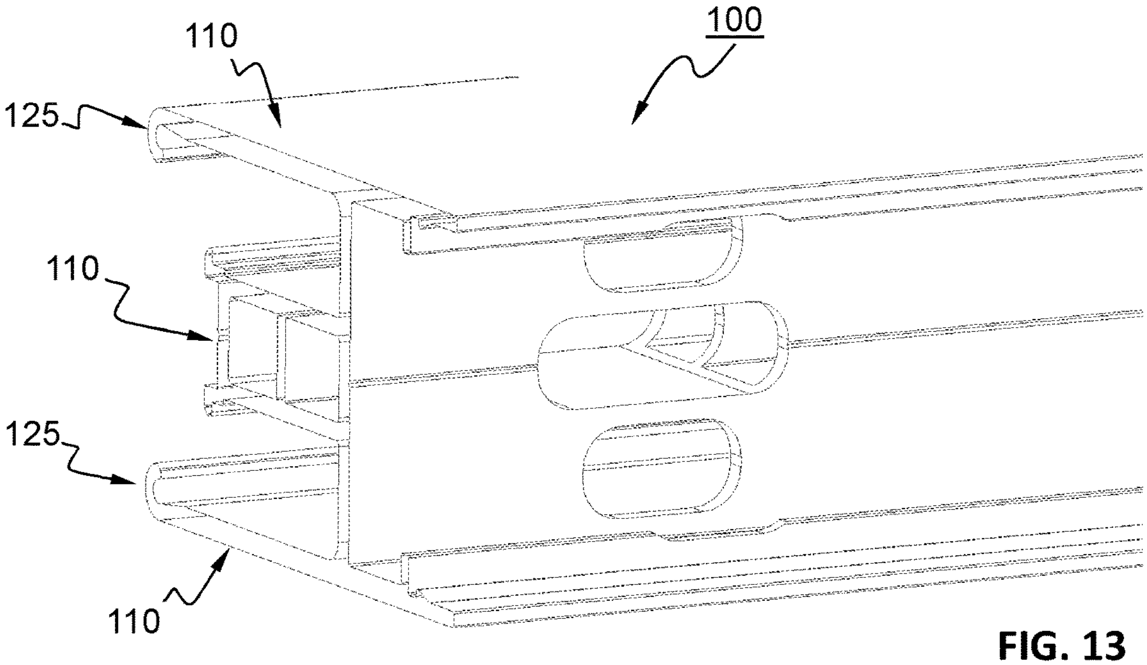
FIG. 13 is a perspective bottom view of a frame profile (100) of the tensioning system (10) described herein.

For further explanation of the present invention and the use thereof, reference is made to FIG. 1 to FIG. 9. These figures show a double-sided tensioning system (10) according to a first preferred embodiment in side view (in the transverse direction of the frame), wherein the locking element (300) is placed in the frame profile (100) along the central side of the frame profile (100), i.e. the locking element (300) will move in the lateral direction (L) of the frame. The back wall of the frame profile (100) may, in this first preferred embodiment, be provided with an opening for inserting the locking element (300). An example hereof is shown in FIG. 13.

FIG. 1 to FIG. 9 also show a method for the dynamic tensioning of two canvases by means of this first preferred embodiment of the double-sided tensioning system (10). A person skilled in the art will appreciate that the tensioning of canvases by means of the alternative embodiments according to the present invention as described herein may be carried out in a similar manner. Examples of other preferred embodiments of the tensioning system (10) are discussed in more detail in example 3. FIG. 1 to FIG. 9 will be discussed hereunder in chronological order, i.e. in the order for mounting a canvas (50) on the tensioning system (10) according to a first preferred embodiment of the tensioning system.

First Preferred Embodiment of the Tensioning System

As shown in FIG. 1, first a frame profile (100) is provided. The frame profile (100) comprises a back wall provided with an upright central part (110) that extends in the lateral direction (L) of the frame. The back wall is further provided with two side walls (120) that extend in the central direction (C) of the frame and in the lateral direction (L) of the frame. At their lateral end, the two side walls (120) are provided with an inward-directed stop (125).

Figure 2:
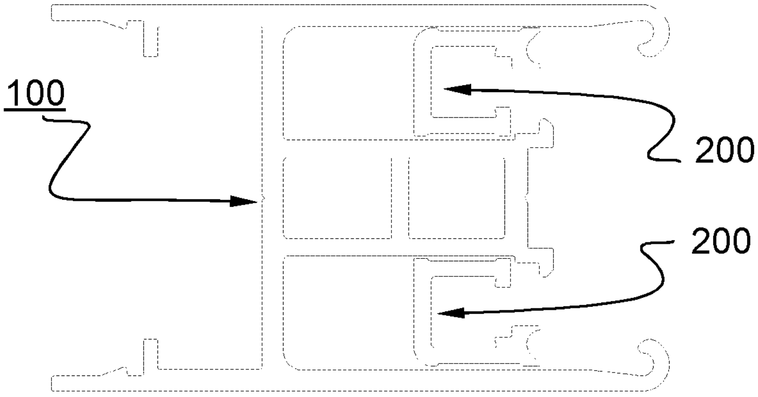

FIG. 2 shows how two guides (200) are placed movably in the frame between the central part (110) and a different side wall (120). Each guide (200) is provided with an opening for inserting the canvas (50); this opening is oriented in the lateral direction (L) of the frame.

Figure 3:
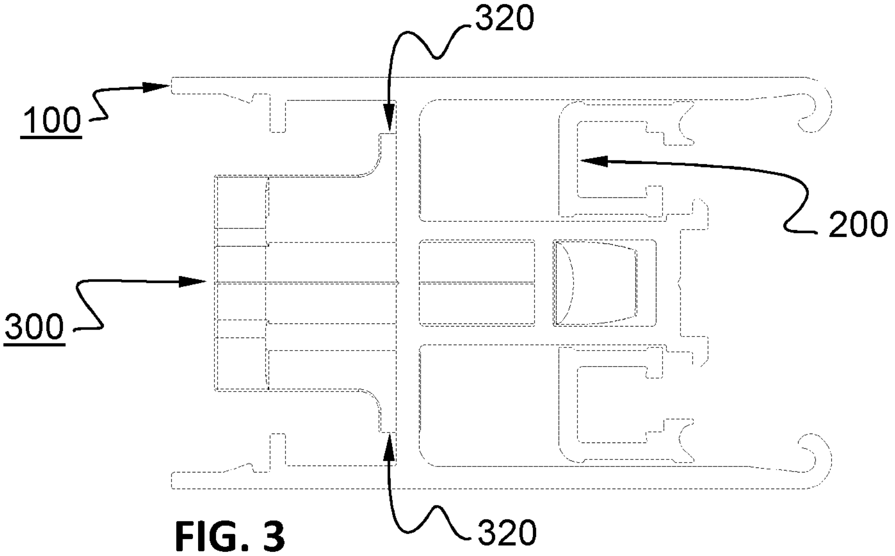

FIG. 3 shows further how a locking element (300) is provided. Examples of other embodiments of the locking element (300) are discussed in more detail in example 2. The locking element (300) is placed sliding in the central part (110). The locking element (300) is provided on either side with two blocking pieces (320).

Figure 4:
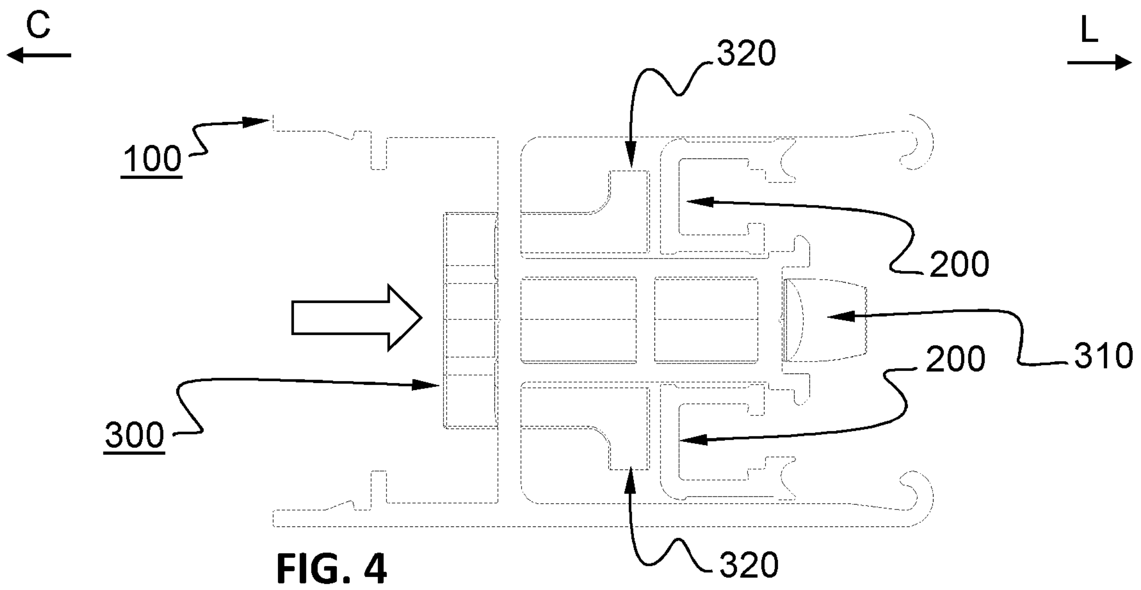

FIG. 4 shows the moving of the locking element (300) through the central part (110) in the lateral direction (L) of the frame (on the right in these figures). As a result, the blocking pieces (320) of the locking element (300) will come into contact with the two guides (200) and consequently mechanically block the movement of the guides (200) in the central direction (C) of the frame. The locking element (300) may, in this first "pushed-in" position, be coupled to the central part (110) so that it cannot slide out again. Examples of the couplings of the locking element (300) to the frame profile (100) are discussed in more detail in example 2.

Figure 5:
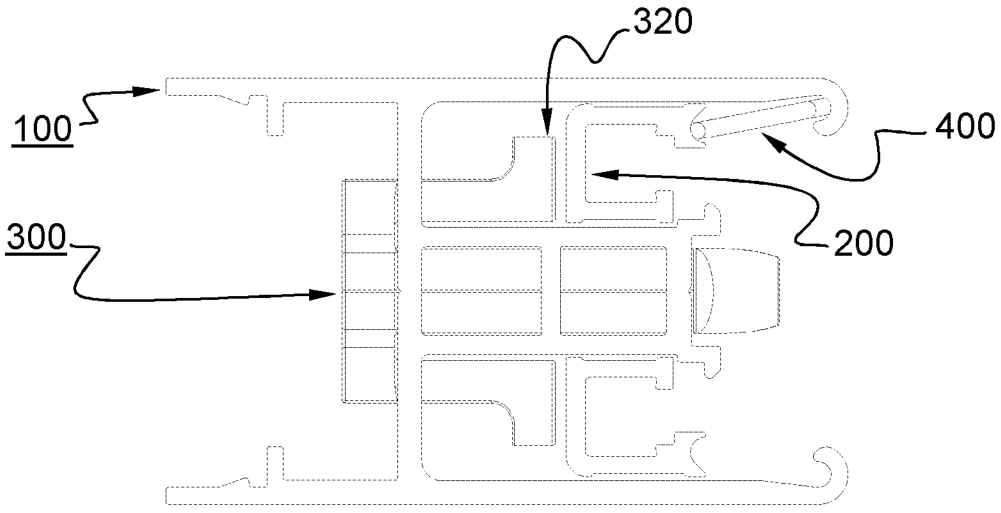

FIG. 5 shows how a first tensioning means (400) is tensioned between the stop (125) of the first side wall (120) and the first guide (200) so that the first tensioning means (400) can tension the first guide (200) in the central direction (C) of the frame (on the left in these figures). This will ensure that the first guide (200) will move in the central direction (C) of the frame, but this movement will from a certain point be blocked by the adjacent blocking piece (320) of the locking element (300).

Figure 6:
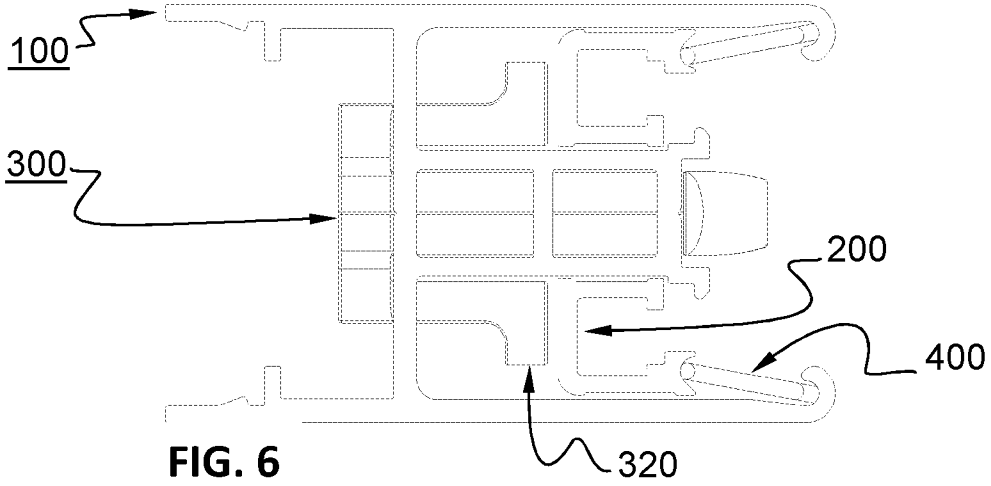

Equivalently, FIG. 6 shows how a second tensioning means (400) is placed between the stop (125) of the second side wall (120) and the second guide (200). The second tensioning means (400) tensions the second guide (200) in the central direction (C) of the frame (on the left in these figures), but the movement of this guide (200) will equivalently also be blocked by the adjacent blocking piece (320) of the locking element (300). Embodiments for placing the tensioning means (400) on another position in the frame profile (100) are discussed in more detail in example 3.

Figure 7:
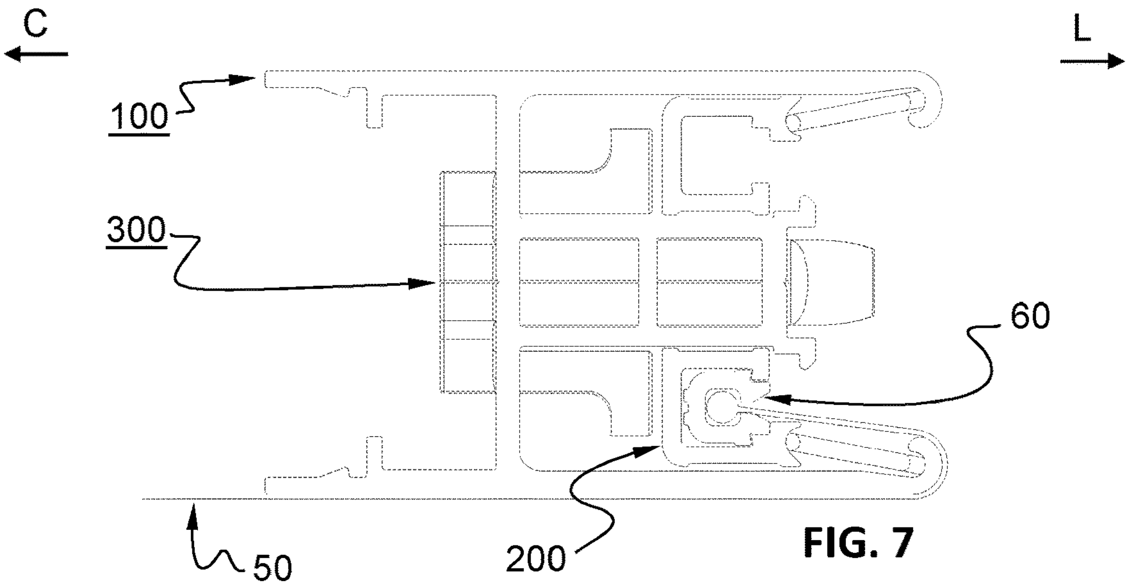

FIG. 7 shows how a first canvas (50) is fastened to a first guide (200) by means of a first canvas fastening element (60). The canvas (50) is in this case provided with a zip on a side thereof and the canvas fastening element (60) is a zip guide (60) which is pushed into the guide (200). Because the guide (200) is blocked in the central direction (C) of the frame, the first canvas (50) remains in an unclamped state.

Figure 8:
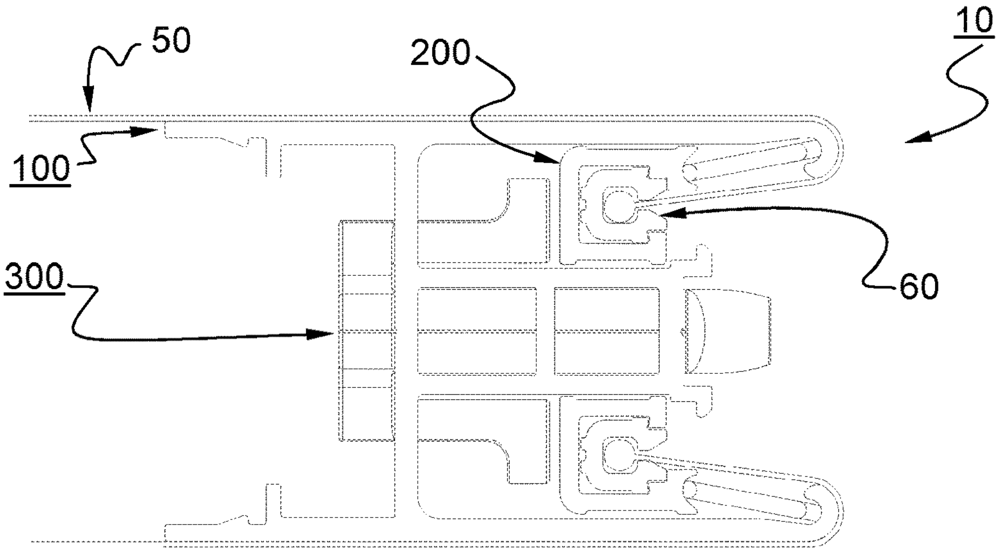

Equivalently, FIG. 8 shows how a second canvas (50) is fastened to the other guide (200) by means of a second canvas fastening element (60). The second canvas (50) is also provided with a zip on a side thereof, which is placed in a zip guide (60) that is pushed into the guide (200). The second canvas (50) also remains in an unclamped state.

Figure 9:
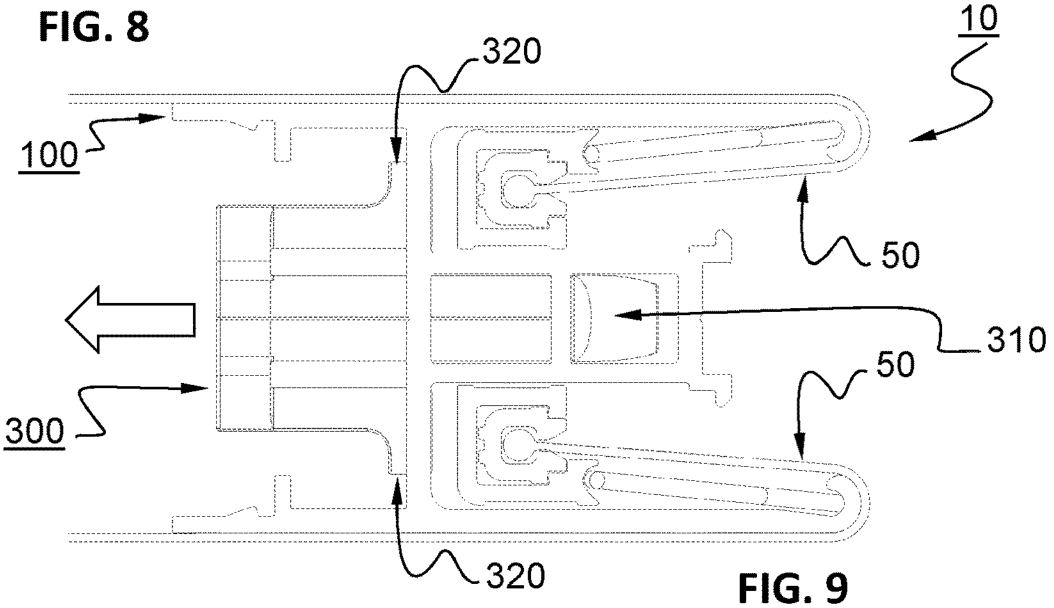

FIG. 9 shows the movement of the locking element (300) in the central direction (C) of the frame. As a result, the blocking pieces (320) of the locking element (300) will be moved along with it, so that they no longer block the movement of the guides (200) in the central direction (C) of the frame. The guides (200) will move owing to the tensioning of the two adjacent tensioning means (400) in the central direction (C) of the frame and consequently the two canvases (50) will be stretched over the side walls (120) of the frame profile (100). The locking element (300) may, in this second "pushed-out" position, be coupled to the central part (110) so that it cannot slide back in. Embodiments of the locking element (300) and the couplings thereof to the frame profile (100) are discussed in more detail in example 2.

Figure 10A:
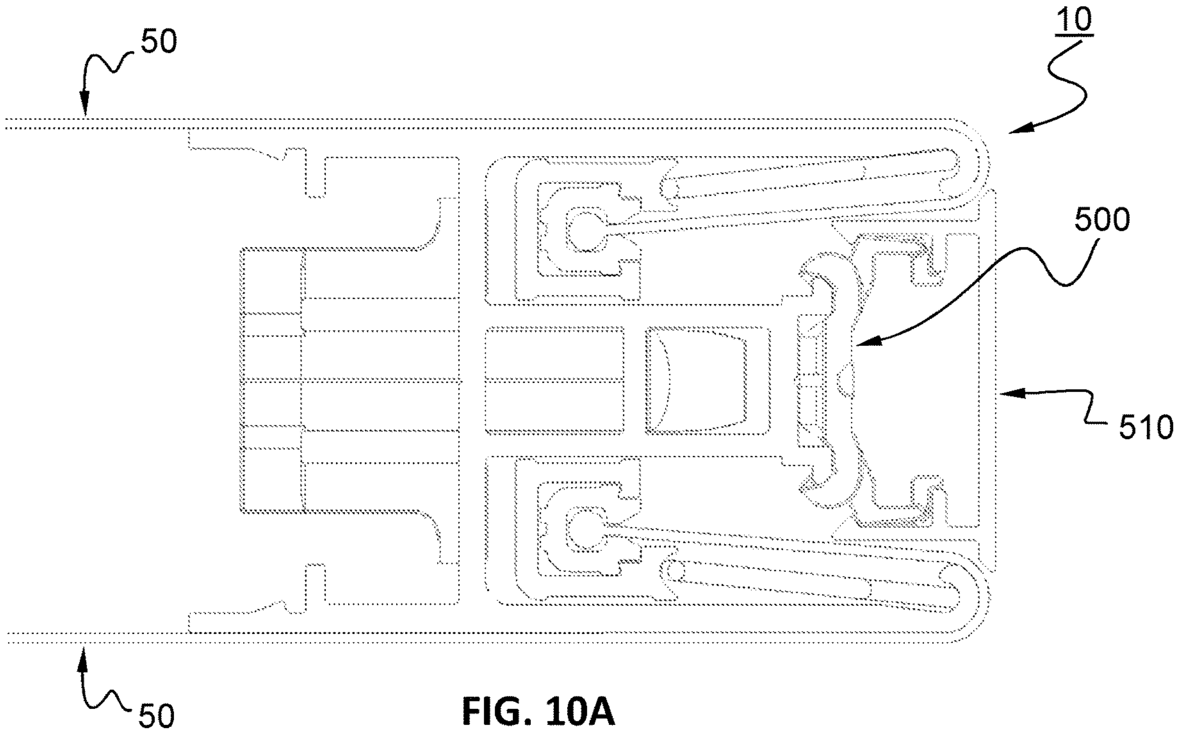
FIG. 10A is a side view of the tensioning system (10) described herein, further provided with a fitting (500) coupled to an inserted lateral cover profile (510).
Figure 10B:
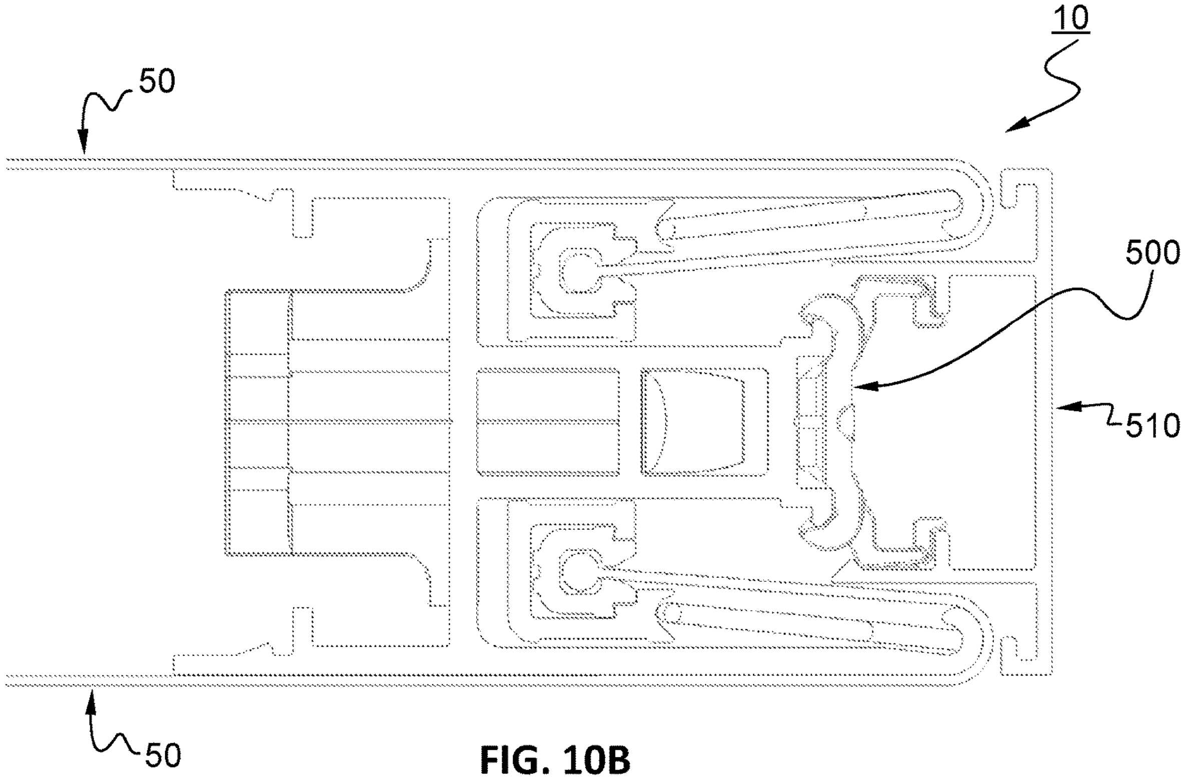
FIG. 10B is a side view of the tensioning system (10) described herein, further provided with a fitting (500) coupled to a surface-mounted lateral cover profile (510).
Figure 11:
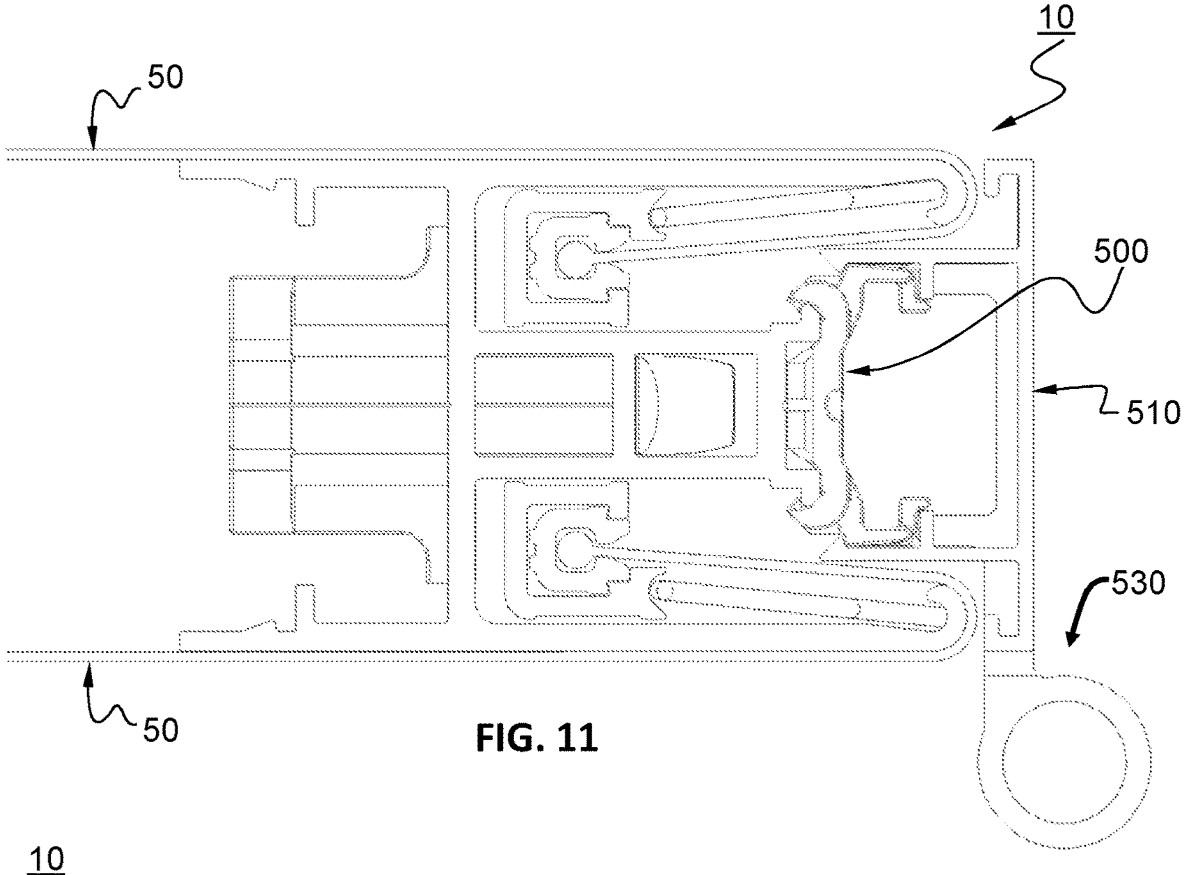
FIG. 11 is a side view of the tensioning system (10) described herein, further provided with a fitting (500) coupled to a frame element (530).
Figure 12:
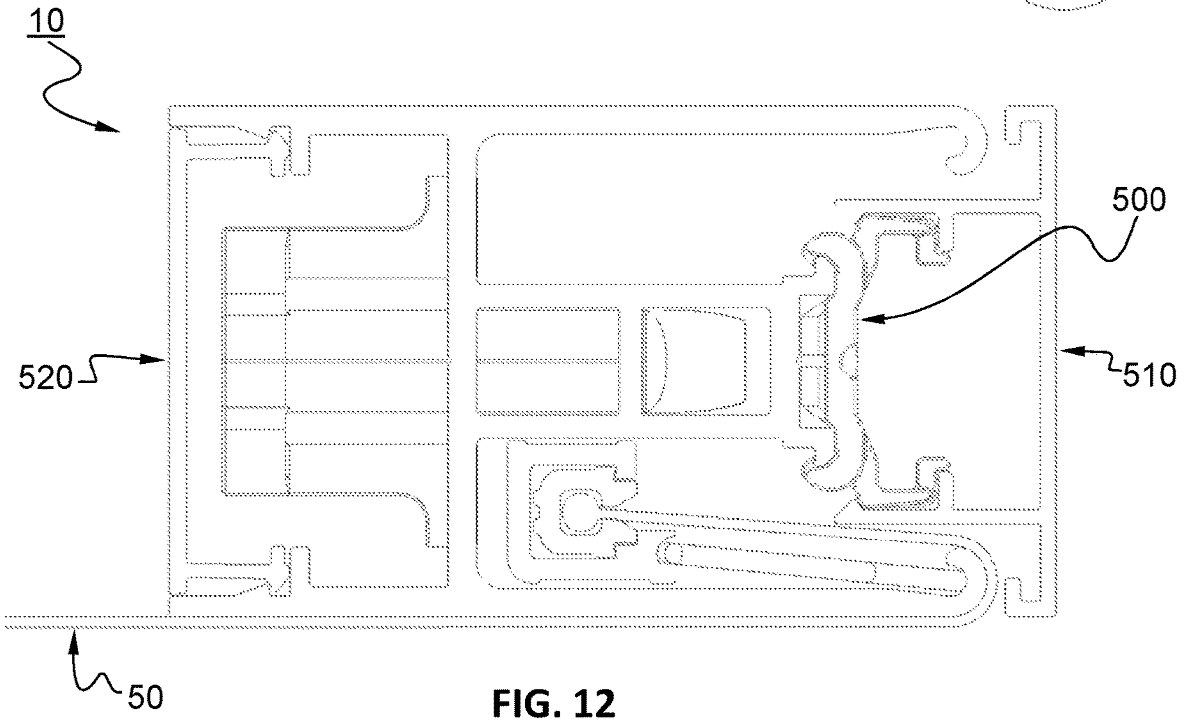
FIG. 12 is a side view of the tensioning system (10) described herein, further provided with a fitting (500) coupled to a surface-mounted lateral cover profile (510), and a central cover profile (520).

Moreover, FIG. 10 to FIG. 12 show different embodiments for the optional finishing of the tensioning system (10). In particular, the tensioning system (10) may further be provided with a fitting (500), which can be coupled to the central part (110) of the frame profile (100). FIG. 10A then shows how an inserted lateral cover profile (510) can be coupled to the fitting (500). FIG. 1013 then shows how a surface-mounted lateral cover profile (510) can be coupled to the fitting (500). FIG. 11 then shows how a frame element (530) can be coupled to the fitting (500).

Finally, FIG. 12 shows that the tensioning system (10) may also be further provided with a central cover profile (520), which may be coupled to the frame profile (100). This last embodiment is especially suitable for concealing the components of the tensioning system (10) on the rear of a single-sided tensioning system (10). A person skilled in the art will understand that these optional finishing forms shown in FIG. 10 to FIG. 12 can easily be combined with one another.

Example 2: Locking Elements

Figure 25:
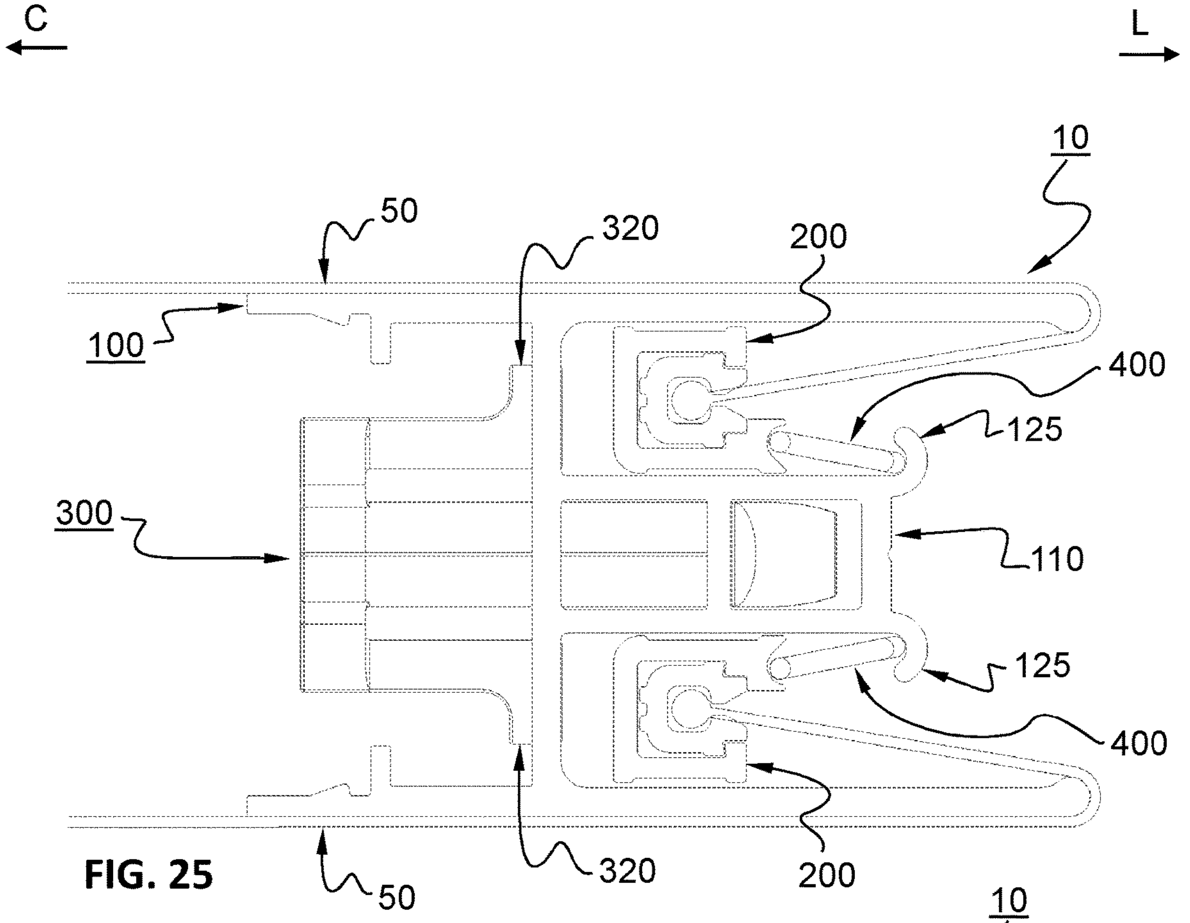
FIG. 25 to FIG. 30 show an operating principle for the placement of a tensioning means (400) according to various preferred embodiments of the tensioning system (10) described herein. These figures are discussed in more detail in Example 3.
Figure 26:
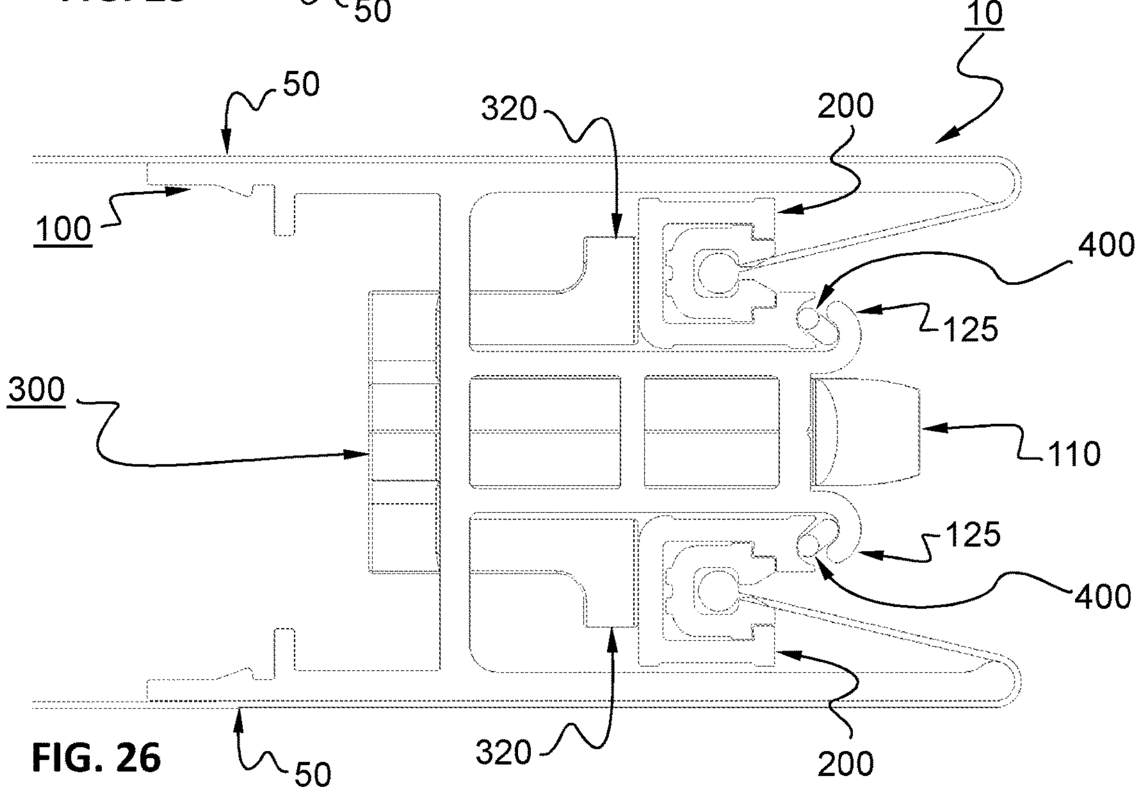

For further explanation of the locking element (300) and the coupling thereof to the frame profile (100), various preferred embodiments of a locking element (300) are discussed with reference to FIG. 13 to FIG. 26. FIG. 13 shows a frame profile (100), which is provided with an opening in the back wall of the frame profile (100), wherein this opening comes out in the central part (110). Moreover, FIG. 14 to FIG. 18 show a first preferred embodiment, FIG. 19 to FIG. 23 show a second preferred embodiment and FIG. 24 to FIG. 26 show a third preferred embodiment of the locking element (300).

These three embodiments of the locking element (300) and the possible couplings thereof to the frame profile (100) shown in FIG. 13 are each discussed separately hereunder. A person skilled in the art will appreciate that there are yet other variations of these embodiments and that aspects thereof may also be combined with one another.

First Preferred Embodiment of the Locking Element

Figure 14:
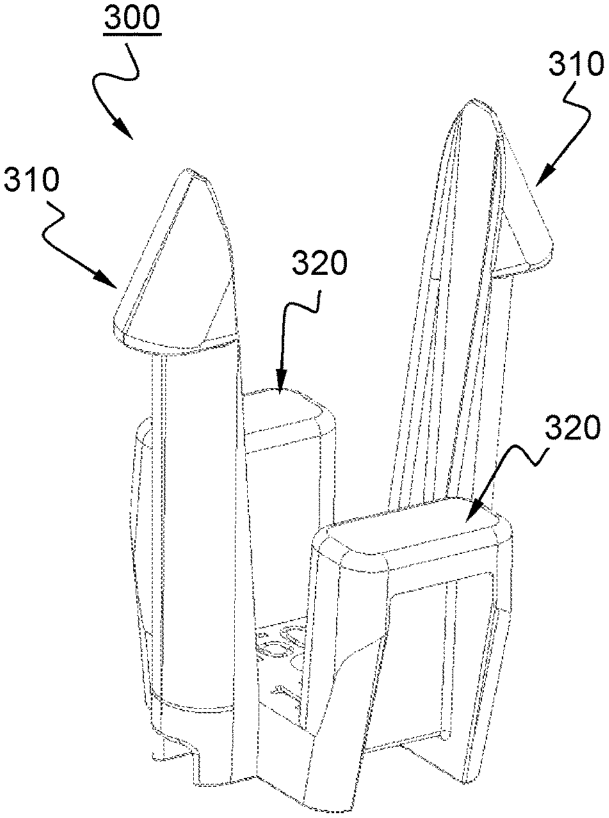
FIG. 14 to FIG. 24 show an operating principle for coupling a locking element (300) to the frame profile (100) according to various preferred embodiments of the tensioning system (10) described herein. These figures are discussed in more detail in Example 2.
Figure 15:
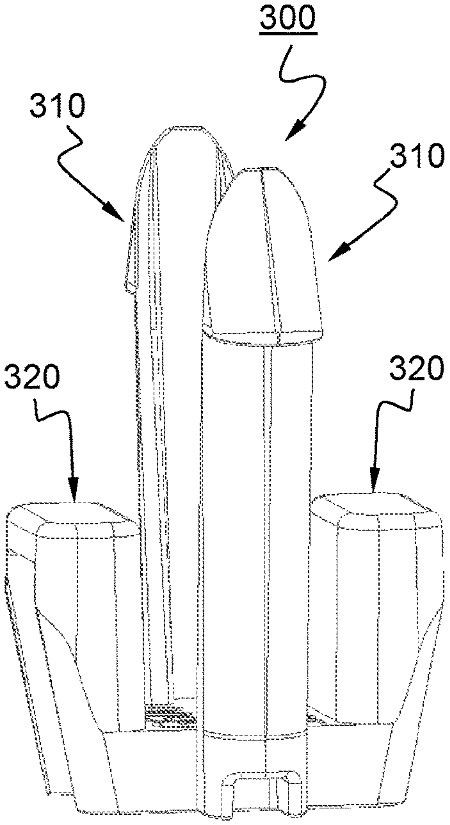

FIG. 14 to FIG. 28 show the locking element (300) according to a first preferred embodiment. In this embodiment the locking element (300) is provided with two impressible projections. FIG. 14 and FIG. 15 show these impressible projections in a perspective view. The end of each projection is provided with an outward-directed sloping end face that can serve as coupling means (310), in particular the sloping end face can hook into an opening such as a hooking point (310).

This locking element (300) is further provided with two sideways projecting wings, which form two blocking pieces (320) on either side of the locking element (300). The end of each blocking piece (320) is provided with a flattened end point that can serve as a stopper for an adjacent guide (300).

As discussed above in example 1, the locking element (300) may be placed in the frame profile (100) of FIG. 13. In particular, FIG. 16 to FIG. 18 show how the locking element (300) according to this first preferred embodiment can be moved through an opening provided in the back wall of the frame profile (100) in the lateral direction (L) of the frame (on the left in the figures).

Figure 16:
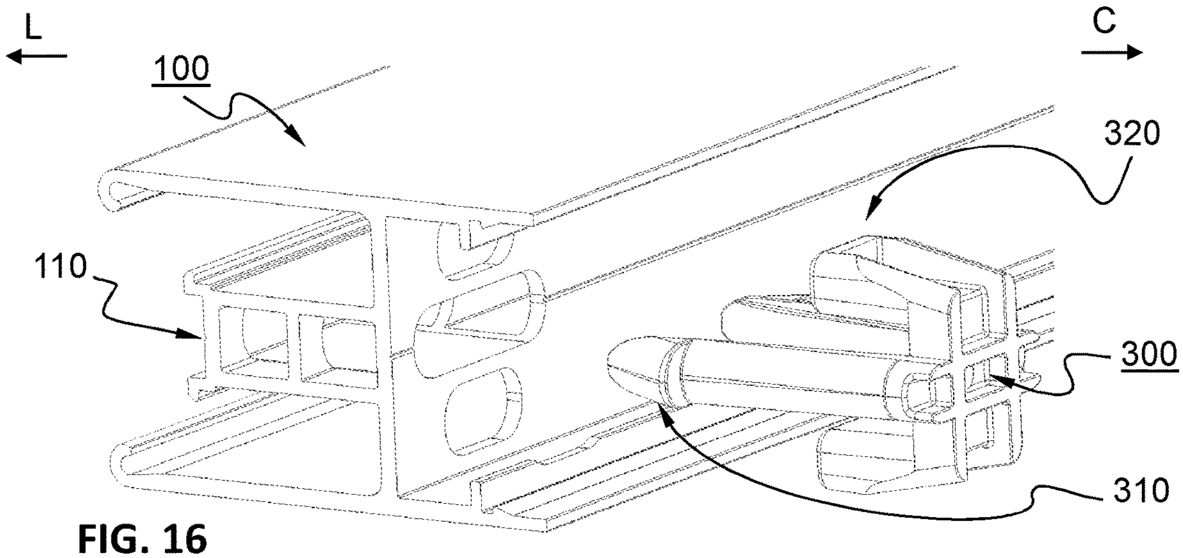

FIG. 16 shows that the locking element (300) is oriented in a manner wherein the projections are positioned in the direction of the frame profile (100). Then the projections are pushed into the frame profile (100). Because the opening provided in the back wall of the frame profile (100) is less than the distance between the two projections, these projections will be pushed in partially during the movement of the locking element (300), i.e. by coming into contact with the partition walls of the central part (110), these projections are pushed in partially.

The central part (110) is further provided with openings in the partition walls where the hooking points (310) can hook in near the ends of each of the projections. As a result, the locking element (300) will be able to couple to the frame profile (100). Provision of one hooking-in point (310) will allow the locking element (300) to couple to the frame profile (100) in only one position, in particular a pushed-in position. Provision of two hooking-in points (310) will allow the locking element (300) to couple to the frame profile (100) in two positions, in particular a pushed-in position and a pushed-out position. A person skilled in the art will understand that providing several hooking-in points also provides several positions for coupling of the locking element (300).

Figure 17:
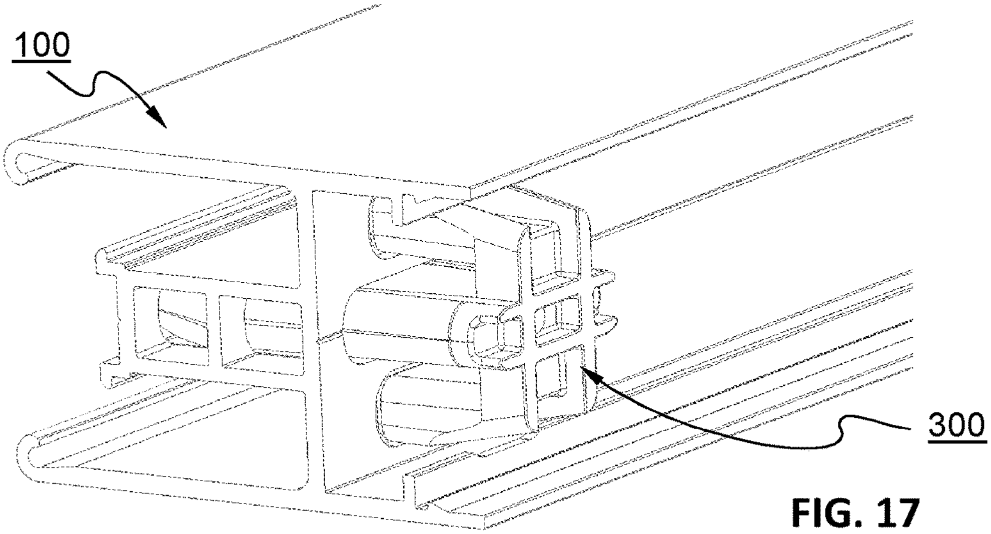
Figure 18:
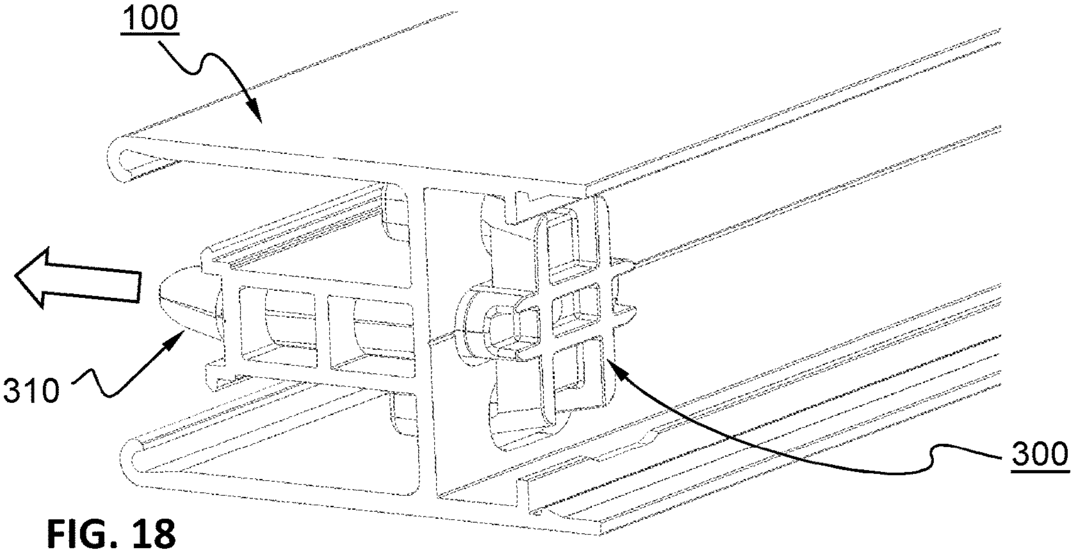

FIG. 17 shows coupling of the locking element (300) to the frame profile (100) in a pushed-out position, i.e. wherein the locking element (300) is only pushed partially into the frame profile (100). The present "pushed-out" position of the locking element (300) will typically coincide with a tensioned state of the fastened canvas (50).

FIG. 18 shows coupling of the locking element (300) to the frame profile (100) in a pushed-in position of the locking element (300), i.e. wherein the locking element (300) is pushed fully into the frame profile (100). The "pushed-in" position of the locking element (300) will typically coincide with an unclamped or only partially tensioned state of the fastened canvas (50).

Second Preferred Embodiment of the Locking Element

Figure 19:
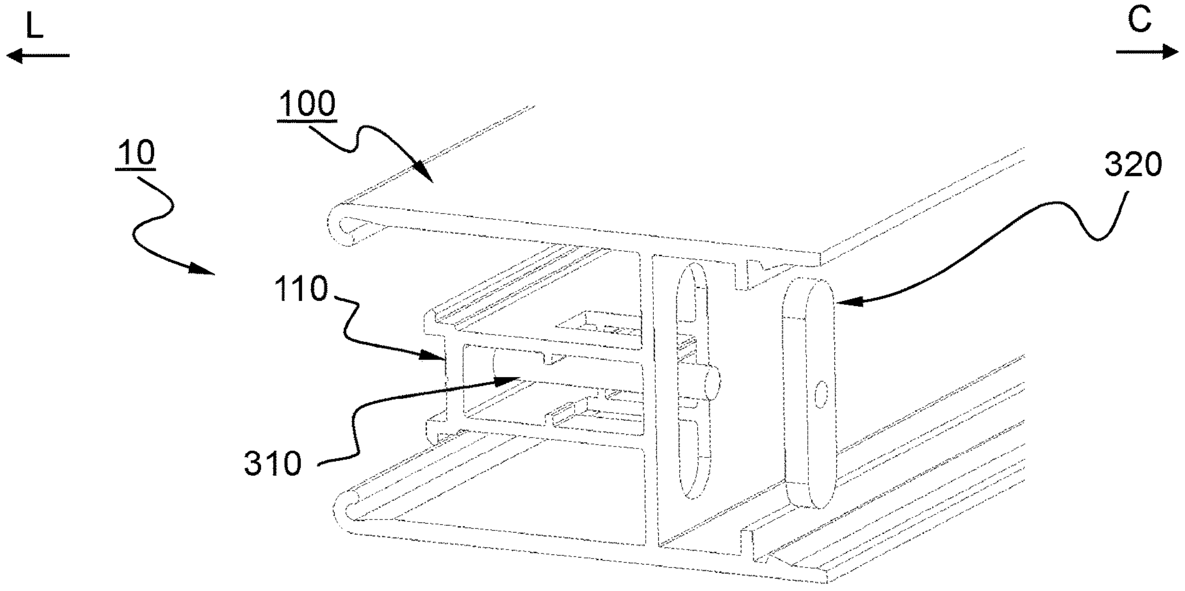
Figure 20:
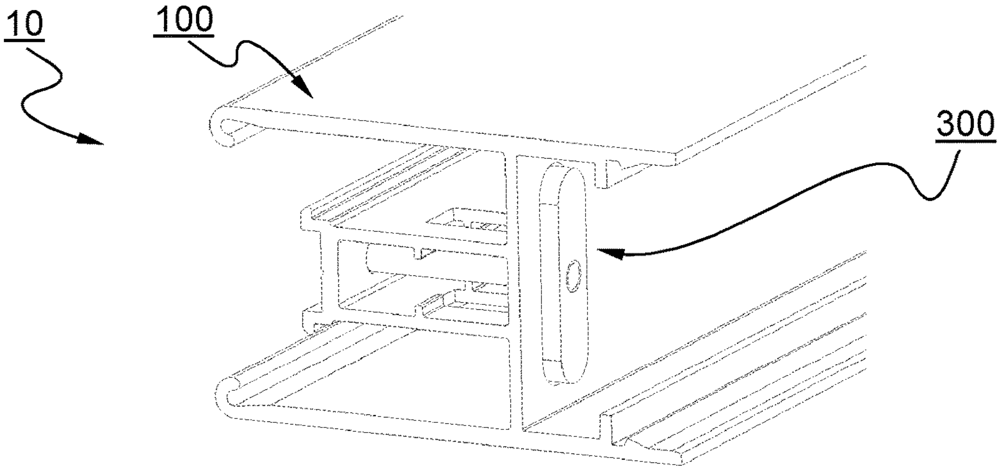
Figure 21:
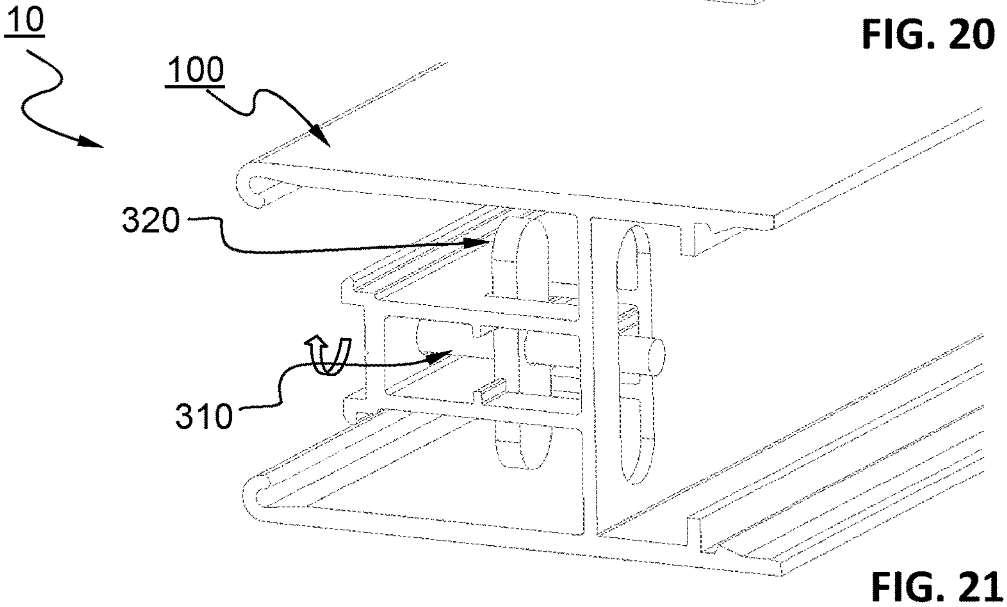

FIG. 19 to FIG. 21 show the locking element (300) according to a second preferred embodiment. In this embodiment the locking element (300) comprises a screw and a nut, which can be turned round the screw. The nut has an elongated body whose ends form blocking pieces (320), which can stop movement of an adjacent guide (200).

FIG. 19 shows that the screw of the locking element (300) can be placed along an opening provided in the central part (110) so that the head of the screw projects on the lateral side (on the right in these figures) of the frame profile (100) and the spindle provided with a screw thread projects on the central side (on the right in these figures) of the frame profile (100).

FIG. 20 shows how this nut can be coupled to the screw and thereby is also coupled to the frame profile (100). When the nut is positioned at the end of the screw, this will coincide with a pushed-out position of the blocking pieces (320). The present "pushed-out" position of the blocking pieces (320), i.e. wherein the nut is positioned at or near an end of the screw, will typically coincide with a tensioned state of the fastened canvas (50).

FIG. 21 shows how the nut provided with the blocking pieces (320) can be moved relative to the frame profile (100). In particular, the direction of the screwing-on of the head of the screw will determine the direction of the displacement of the nut. The locking element (300) may in this embodiment in principle be coupled in a plurality of positions. The present "pushed-in" position of the blocking pieces (320), i.e. wherein the nut is positioned at or near the head of the screw, will typically coincide with an untensioned state of the fastened canvas (50).

Third Preferred Embodiment of the Locking Element

Figure 22:
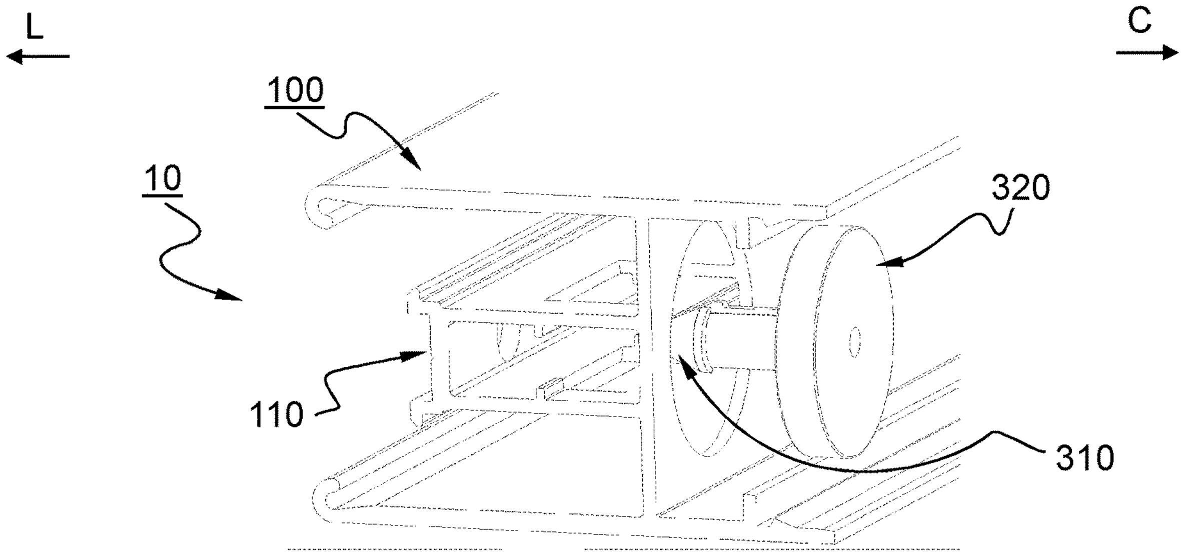
Figure 23:
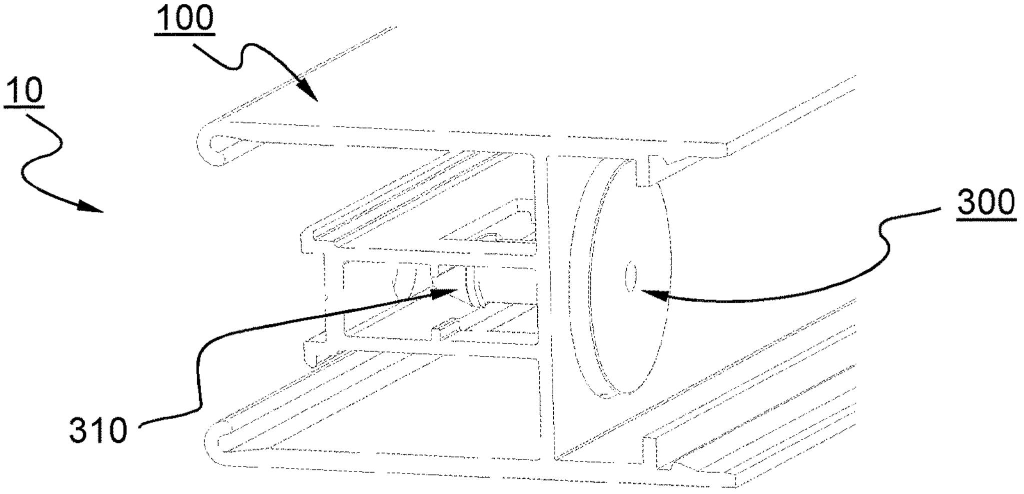
Figure 24:
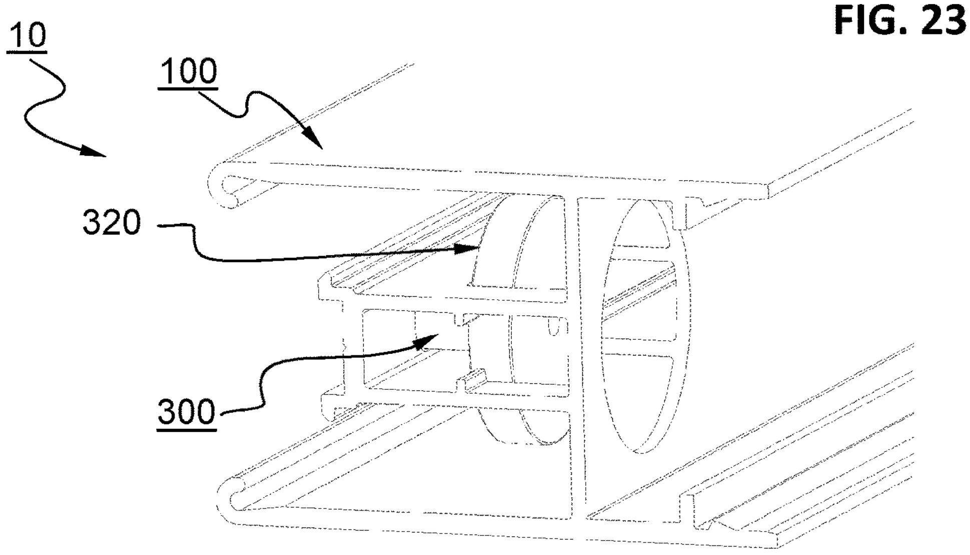

FIG. 22 to FIG. 24 show the locking element (300) according to a third preferred embodiment. In this embodiment the locking element (300) is provided with two impressible projections which, equivalently to the first preferred embodiment, are each provided with an outward-directed sloping end face that can serve as a hooking point (310).

This locking element (300) is further provided with a circular end that forms a plane around the impressible projections (310). A side of the circular end forms a continuous blocking piece (320) that serves as a stopper for an adjacent guide (300).

FIG. 23 shows a placement of the locking element (300) in a pushed-out position, i.e. wherein the blocking piece (320) is only partially pushed into the frame profile (100). The locking element (300) may optionally be coupled to the frame profile (110) or may also remain uncoupled.

FIG. 24 shows coupling of the locking element (300) in a pushed-in position of the locking element (300), i.e. wherein the blocking piece (320) is pushed fully into the frame profile (100). The "pushed-in" position of the locking element (300) will typically coincide with an untensioned or only partially tensioned state of the fastened canvas (50).

Example 3: Tensioning of the Tensioning Means

Figure 27:
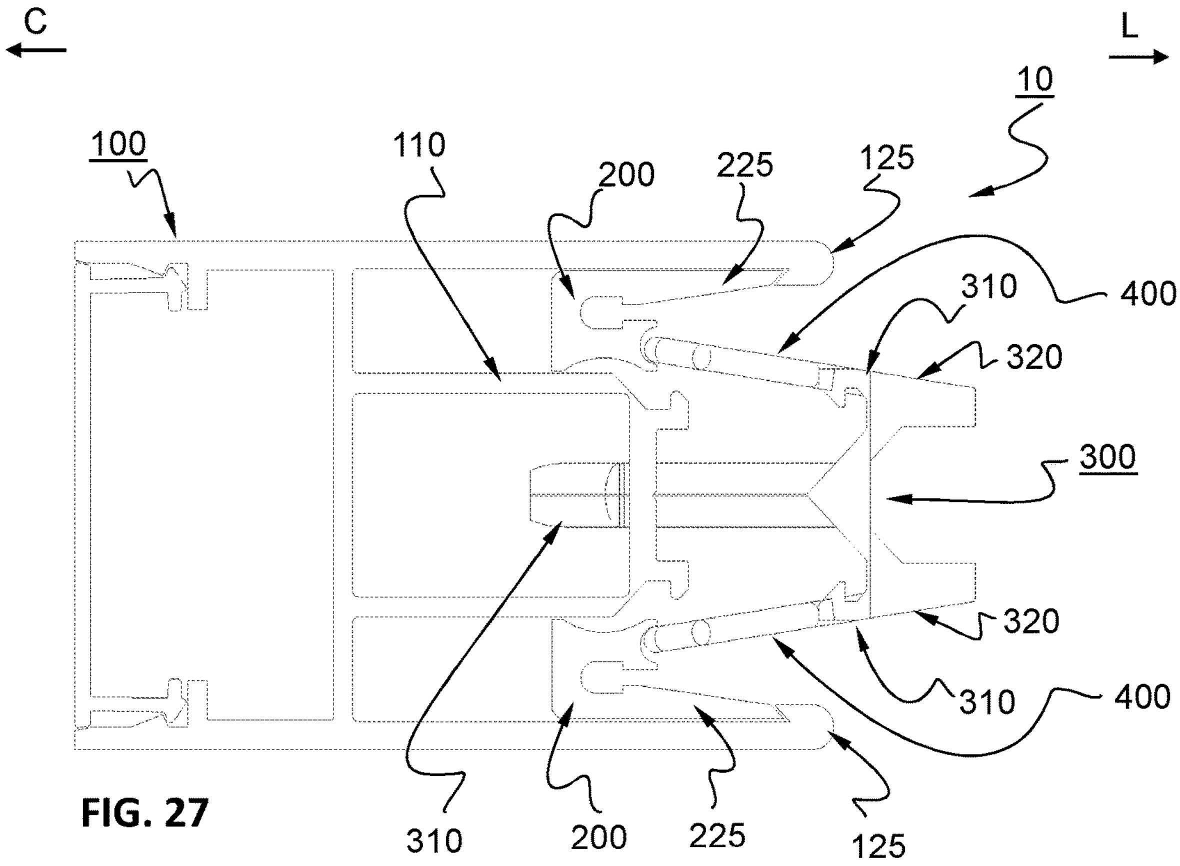
Figure 28:
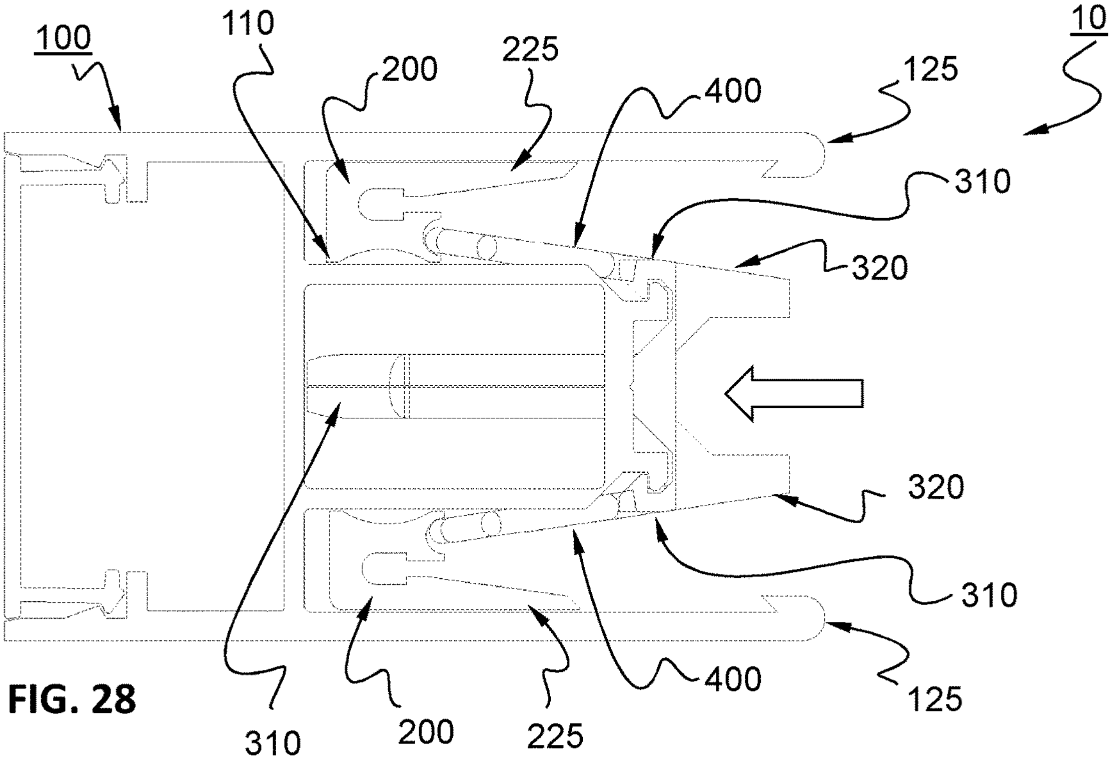
Figure 29:
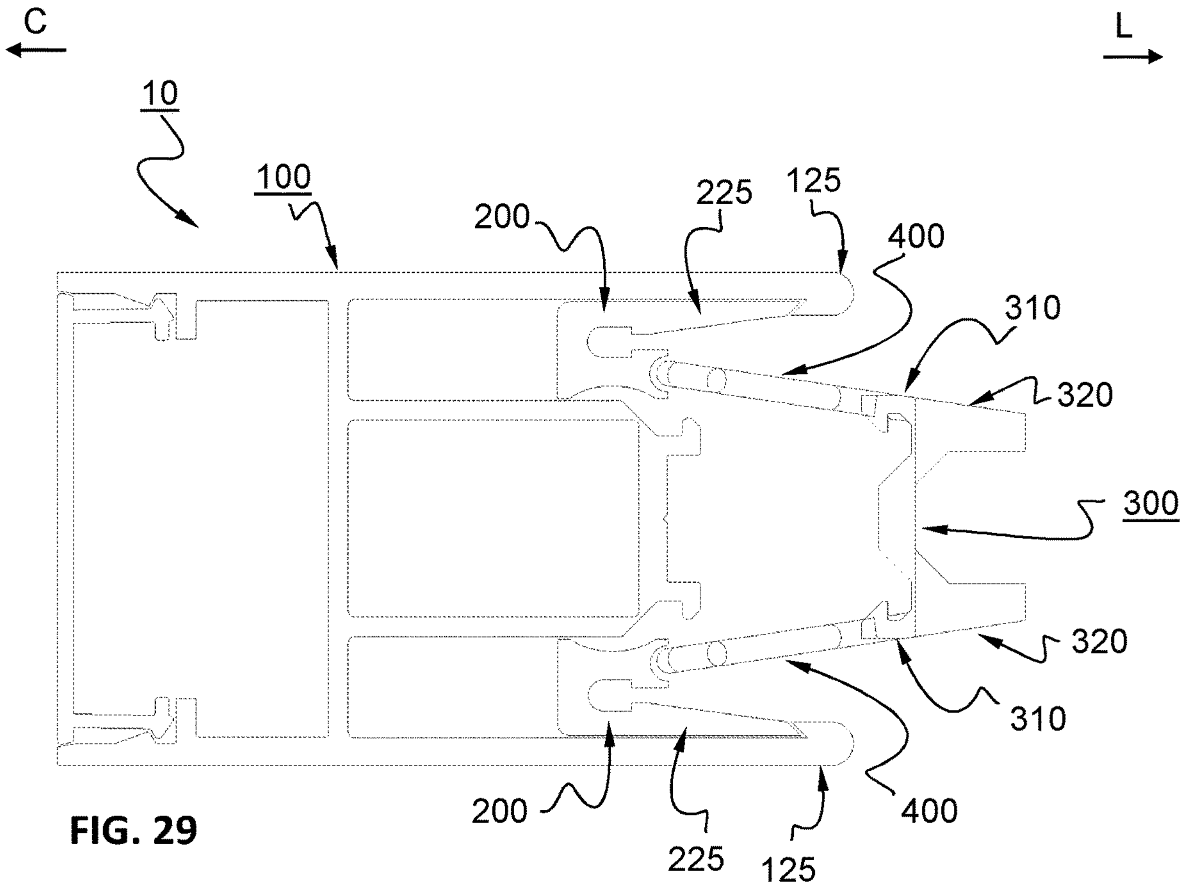
Figure 30:
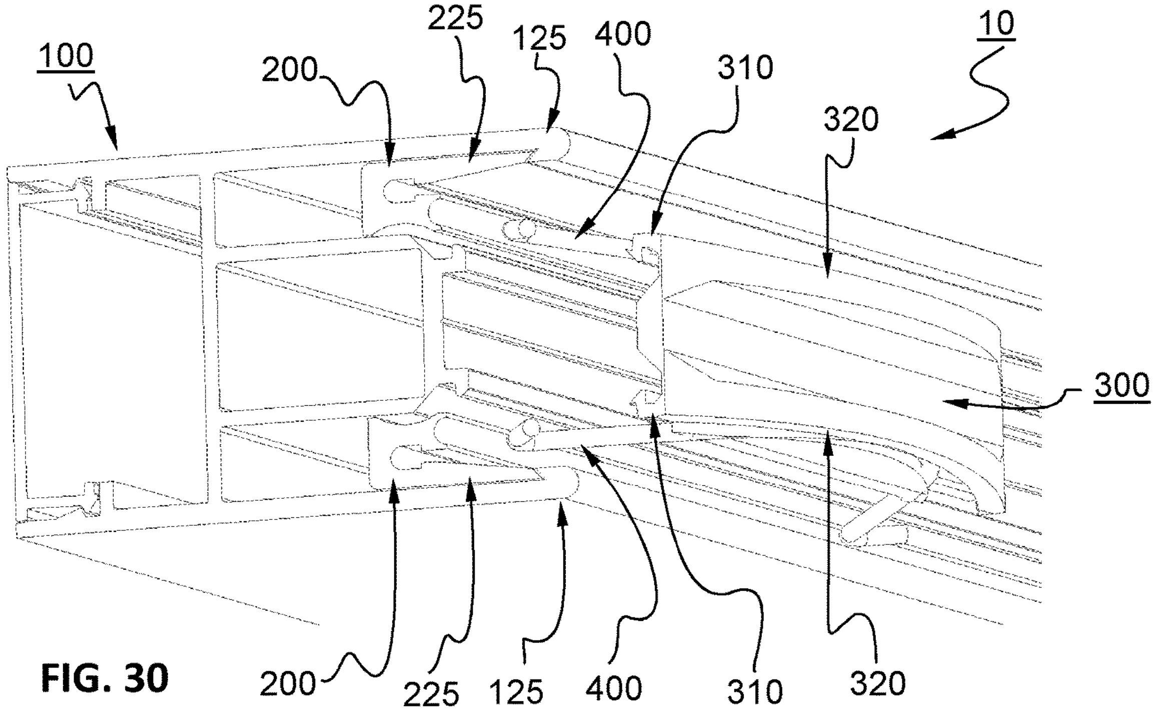

For further explanation of the tensioning means (400) and the tensioning thereof in the frame profile (100), various preferred embodiments of the double-sided tensioning system (10) are discussed, referring to FIG. 25 to FIG. 30. In particular, FIG. 25 and FIG. 26 show a second preferred embodiment of the tensioning system (10), FIG. 27 and FIG. 28 show a third preferred embodiment of the tensioning system (10) and FIG. 29 and FIG. 30 show a fourth preferred embodiment of the tensioning system (10).

To avoid unnecessary repetition in the description, only the structural differences between the different embodiments are discussed below and reference is made to Example 1 for explanation of the general operating principle of the tensioning system (10). A person skilled in the art will appreciate that yet other variations of these embodiments exist and that aspects thereof may also be combined with one another.

Second Preferred Embodiment of the Tensioning System

FIG. 25 and FIG. 26 show a second preferred embodiment of the tensioning system (10), wherein the central part (110) of the frame profile (100) is provided on either side with at least two outward-directed stops (125) at one end thereof. The tensioning means (400) may be tensioned between these various outward-directed stops (125) and the adjacent guides (200). In contrast to the first preferred embodiment, the tensioning means (400) will as a result be oriented toward the central part (110) instead of toward the side walls (120).

Coupling of the locking element (300) to the frame profile (100) takes place equivalently to the embodiment described in Example 1. In particular, the locking element (300) will be placed along the central side of the frame profile (100) in the central part, i.e. the locking element (300) will be pushed-in in the lateral direction of the frame. In this embodiment, the back wall of the frame profile (100) is provided with an opening for inserting the locking element (300). A displacement of the locking element (300) from a "pushed-in" position, as shown in FIG. 26, to a "pushed-out" position, as shown in FIG. will tension the two canvases (50) on either side of the frame.

Third Preferred Embodiment of the Tensioning System

FIG. 27 and FIG. 28 show a third preferred embodiment of the tensioning system (10), wherein the locking element (300) is provided on either side with two blocking pieces (320). The tensioning means (400) may be tensioned between these various blocking pieces (320) and the adjacent guides (200). In contrast to the first preferred embodiment, the tensioning means (400) will as a result be oriented toward the central part (110) instead of toward the side walls (120).

The guides (200) are further provided with a sideways-projecting blocking wall (225), which can come into contact with a stop (125) provided on the end of a side wall (120) of the frame profile (100) to block the movement of these guides (200) in the lateral direction (L) of the frame. The blocking wall (225) will thus prevent the guides being pulled out of the frame profile (100) when mounting a canvas (50).

Coupling of the locking element (300) takes place along the lateral side of the frame profile (100), i.e. the locking element (300) will be pushed-in in the central direction of the frame. In this embodiment, the central part (110) of the frame profile (100) is provided with an opening for inserting the locking element (300). In this third preferred embodiment, the locking element (300) is provided with several coupling means (310). The first coupling means (310) relates to two impressible projections, which are provided with an outward-directed hooking point (310). The central part (110) of the frame profile (100) is provided with at least one opening, on which these hooking points (310) can hook firmly to couple the locking element (300) to the central part (110) in a first "pushed-out" position, as shown in FIG. 27. In this first "pushed-out" position, the canvases (50) provided on either side of the frame will be untensioned.

The second coupling means (310) relates to two inward-directed hooking points (310) provided on an underside of the locking element (300). These hooking points (310) can hook onto two outward-directed stops (125) provided at one end of the central part (110) of the frame profile (100) to couple the locking element (300) to the central part (110) in a second "pushed-in" position, as shown in FIG. 28. In this first "pushed-in" position, the canvases (50) provided on either side of the frame will be tensioned.

Fourth Preferred Embodiment of the Tensioning System

FIG. 29 and FIG. 30 show a fourth preferred embodiment of the tensioning system (10), wherein the locking element (300) is provided on either side with two blocking pieces (320). The tensioning means (400) can be tensioned between these various blocking pieces (320) and the adjacent guides (200). In contrast to the first preferred embodiment, the tensioning means (400) will as a result be oriented toward the central part (110) instead of toward the side walls (120).

The guides (200) are further provided with a sideways-projecting blocking wall (225), which can come into contact with a stop (125) provided on the end of a side wall (120) of the frame profile (100) to block the movement of these guides (200) in the lateral direction (L) of the frame. The blocking wall (225) will thus prevent the guides being pulled out of the frame profile (100) when mounting a canvas (50).

The coupling of the locking element (300) takes place along the lateral side of the frame profile (100), i.e. the locking element (300) will be pushed-in in the central direction of the frame. In this fourth preferred embodiment, the locking element (300) is provided with two inward-directed hooking points (310) provided on an underside of the locking element (300). These hooking points (310) can hook onto two outward-directed stops (125) provided at one end of the central part (110) of the frame profile (100) to couple the locking element (300) to the central part (110).

In this embodiment, the locking element (300) can only be coupled in one position, wherein this coupling ensures that the canvases (50) provided on either side of the frame are tensioned.

Example 4: Representation of an Embodiment of a Frame

Figure 31:
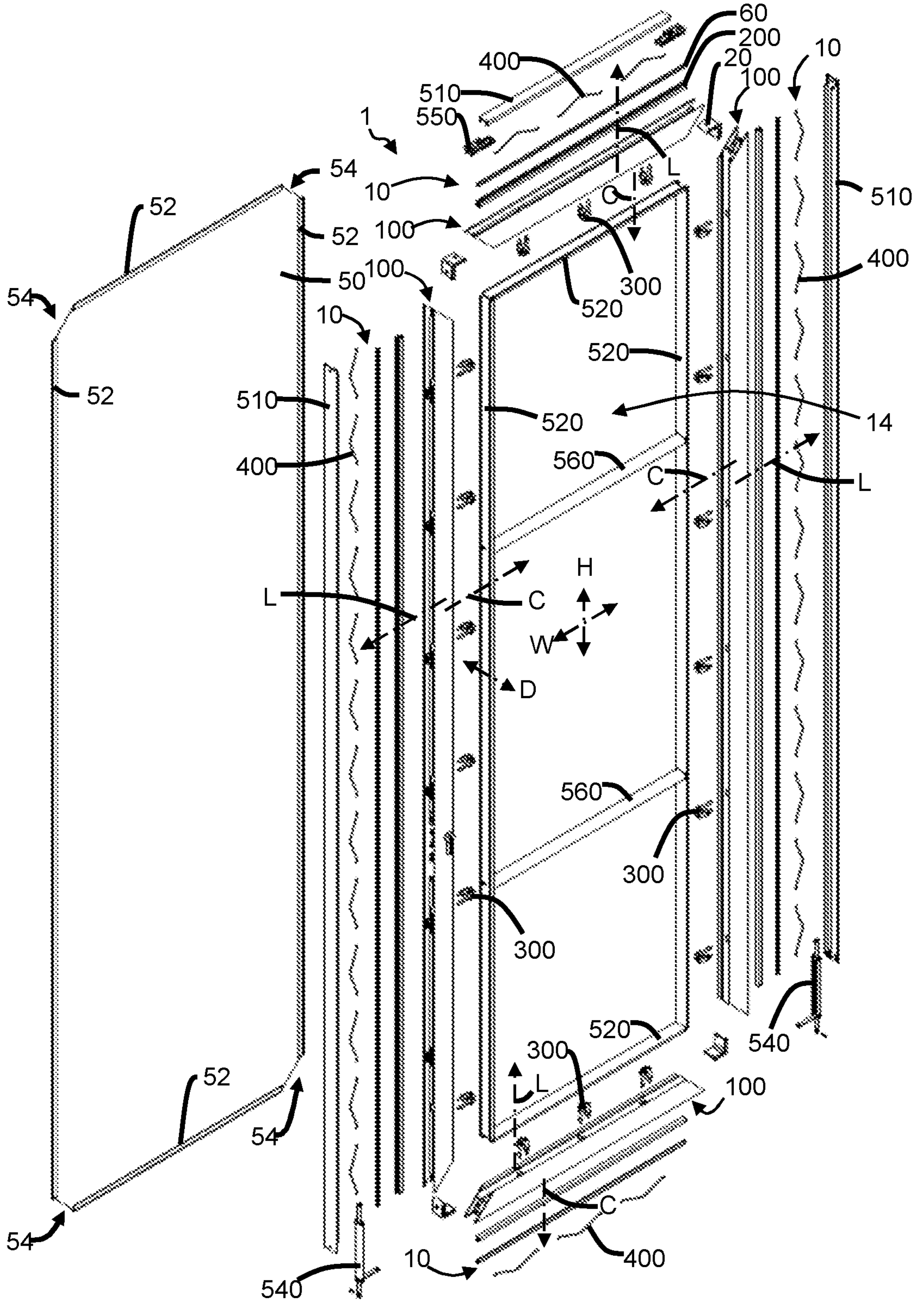
FIG. 31 is an exploded view of an embodiment of a single-sided canvas frame.
Figure 32:
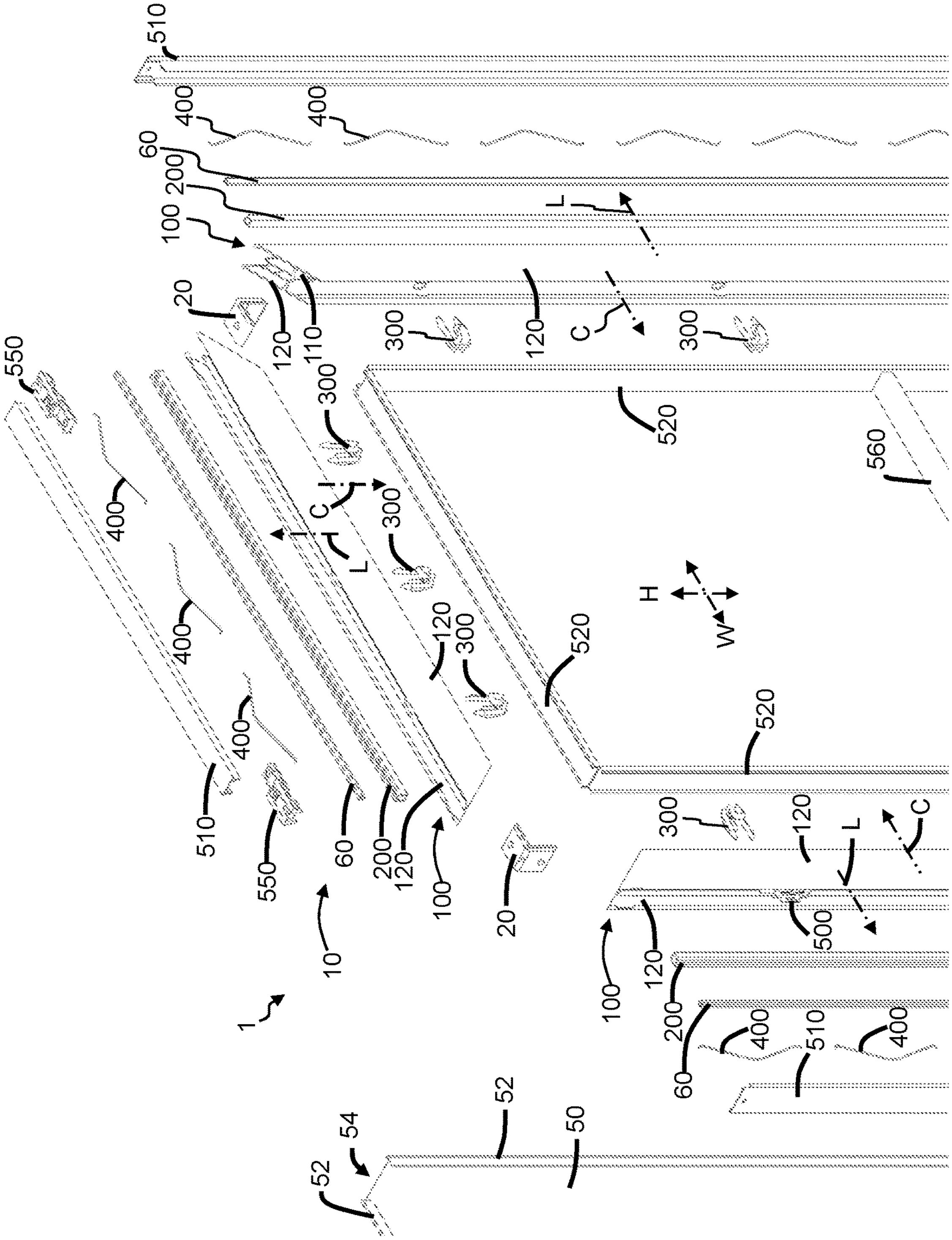
FIG. 32 is a detail of FIG. 31 on a larger scale.

FIG. 31 shows an exploded view of an embodiment of a frame (1), or framework, similar to that already described above, containing an embodiment of a single-sided tensioning system (10) similar to the embodiments as described above. It is clear that the frame (1) functions as a rigid structure to support the aforementioned canvas (50). FIG. 32 shows a detail of FIG. 31 on a larger scale. Similar elements of the embodiment shown in FIG. 31 and FIG. 32 are indicated with similar references and function similarly to the embodiments described above. According to the embodiment example shown, the frame is assembled from four frame profiles (100) similar to what is described above. As stated above, it is clear that alternative embodiment examples are possible, wherein the frame is assembled from another suitable number of frame profiles (100). It is clear that according to the embodiment example shown, the four frame profiles (100) have an identical, or almost identical cross section. However, it is clear that alternative embodiments are possible, wherein the frame profiles (100) of the frame (1) comprise any suitable cross section and/or variations of cross sections. According to the embodiment example shown, at the level of the corners of the frame (1), these frame profiles (100) are coupled to each other by means of a suitable coupling element (20), for example a tensioning element that is configured for securing two nearby profiles to each other. However, it is clear that alternative embodiments are possible, as stated above, for suitably connecting the frame profiles (100) to each other so as to form the frame (1).

As stated above, the embodiment of the frame (1) comprises central and lateral edges relative to the respective frame profiles (100) of the frame (1). As shown, the lateral direction (L) refers to the outward direction, i.e. away from the center of the frame (1). As also shown, the central direction (C) refers to the inward direction, i.e. toward the center of the frame (1). As shown, depending on the position of the respective frame profile (100) of the frame (1) and the orientation of the frame (1), the lateral direction (L) and central direction (C) are upward, downward or sideways (for example to the left or right).

According to the embodiment example presented, the frame profiles (100) are arranged so that the frame (1) approximately forms a rectangle. It is also clear that the frame (1) comprises a central longitudinal plane that is determined by the central longitudinal axis of the frame profiles (100) of the frame (1). It is clear that the lateral direction (L) and the central direction (C) of the frame profiles (100) of a frame (1) extend parallel relative to this central longitudinal plane of the frame (1). Moreover, it is clear that the lateral direction (L) and the central direction (C) of a respective frame profile (100) extend transversely, or approximately transversely, relative to the central longitudinal axis of the respective frame profile (100). In other words, for the embodiment shown, the rectangular frame (1) comprises a central longitudinal plane that extends in a width direction (W) parallel to the central longitudinal axis of the shortest frame profiles (100) and in a longitudinal direction (H) parallel to the central longitudinal axis of the longest frame profiles (100) and transverse to the width direction (W). It is clear that this central longitudinal plane of the frame (1) is also parallel to the plane in which the canvas (50) extends, at least in the zone enclosed by the frame profiles (100) of the frame (1), or in other words the central part of the frame (1) that is located in the central direction (C) within the frame (1) and is surrounded by the frame profiles (100). Thus, it is clear that these directions (H), (W) may be viewed as directions in the longitudinal plane of the frame (1). In other words, the directions (H), (W) may also be viewed as longitudinal directions (H), (W) of the frame (1). As is also shown in FIG. 31 and FIG. 32, the depth direction (D) of the frame (1) is the direction transverse to the longitudinal plane of the frame (1) and thus transverse to the plane defined by the longitudinal direction (H) and the transverse direction (W), and in other words also transverse to the longitudinal direction of the frame profiles (100) as well as transverse to the lateral direction (L) and the central direction (C) of the frame profiles (100).

It is also clear that in the embodiment of a frame (1) shown in FIG. 31 and FIG. 32, the frame (1) comprises four elongated frame profiles (100), which form the perimeter of the frame (1) around an inside surface (14) of the frame (10). It is then clear that according to the embodiment example presented, this perimeter of the frame (1) has a rectangular shape, wherein the four frame profiles (100) each form a side of the rectangular perimeter. The inside surface (14) of the frame (1) is thus located within this rectangular perimeter formed by the frame profiles (100) of the frame (1).

According to the embodiments shown, it is also possible that the frame 10 comprises one or more elongated elements (560) that are fitted within the perimeter of the frame (1), wherein the inside surface 14 is divided into three partial surfaces. According to the embodiment example presented, the elongated elements (560) bridge the distance between two opposite frame profiles (100) that form part of the perimeter of the frame (1). The elongated elements (560) may for example be made as elongated profiles. According to the embodiment example presented, these elongated profiles (560) are fastened at their ends to the respective central cover profiles (520) of the two opposite frame profiles (100). However, it is clear that alternative embodiments are possible, wherein for example the frame (1) is divided into two or more partial frames, wherein the inside surface (14) is divided into two or more partial surfaces. According to an embodiment example of this kind, for example at least one additional elongated element, for example such as a suitable elongated profile, a frame profile (100) is fitted, which bridges the distance between two opposite frame profiles (100) that form part of the perimeter of the frame (1).

The embodiment of the frame profiles (100) of the embodiment of the frame as shown in FIG. 31 and FIG. 32 may for example correspond to the frame profile (100) as shown in FIGS. 1 to 30 described above. According to an embodiment of this kind, the frame profile (100) comprises a back wall (112). This back wall (112) extends between two side walls (120) of the frame profile (100). Moreover, it is clear that the two side walls (120) extend parallel or approximately parallel to the longitudinal plane of the frame (1). Or in other words in a plane defined by the transverse direction (W) and the longitudinal direction (L) of the frame (1). Or in other words in a plane defined by the longitudinal direction of the frame profile (100) and the lateral direction (L) or the central direction (C).

According to the embodiment example presented, the back wall (112) extends in the longitudinal direction of the frame profile (100) and in a plane transverse or approximately transverse to the longitudinal plane of the frame (1), or in other words in a plane defined by the longitudinal direction of the frame profile (100) and the depth direction (D) that extend in the central direction (C) of the frame and in the lateral direction (L) of the frame. As described above, according to the embodiment example presented, this back wall (112) is provided with an upright central part (110) that extends from this back wall (112) in the lateral direction (L) of the frame (1).

Figure 33:
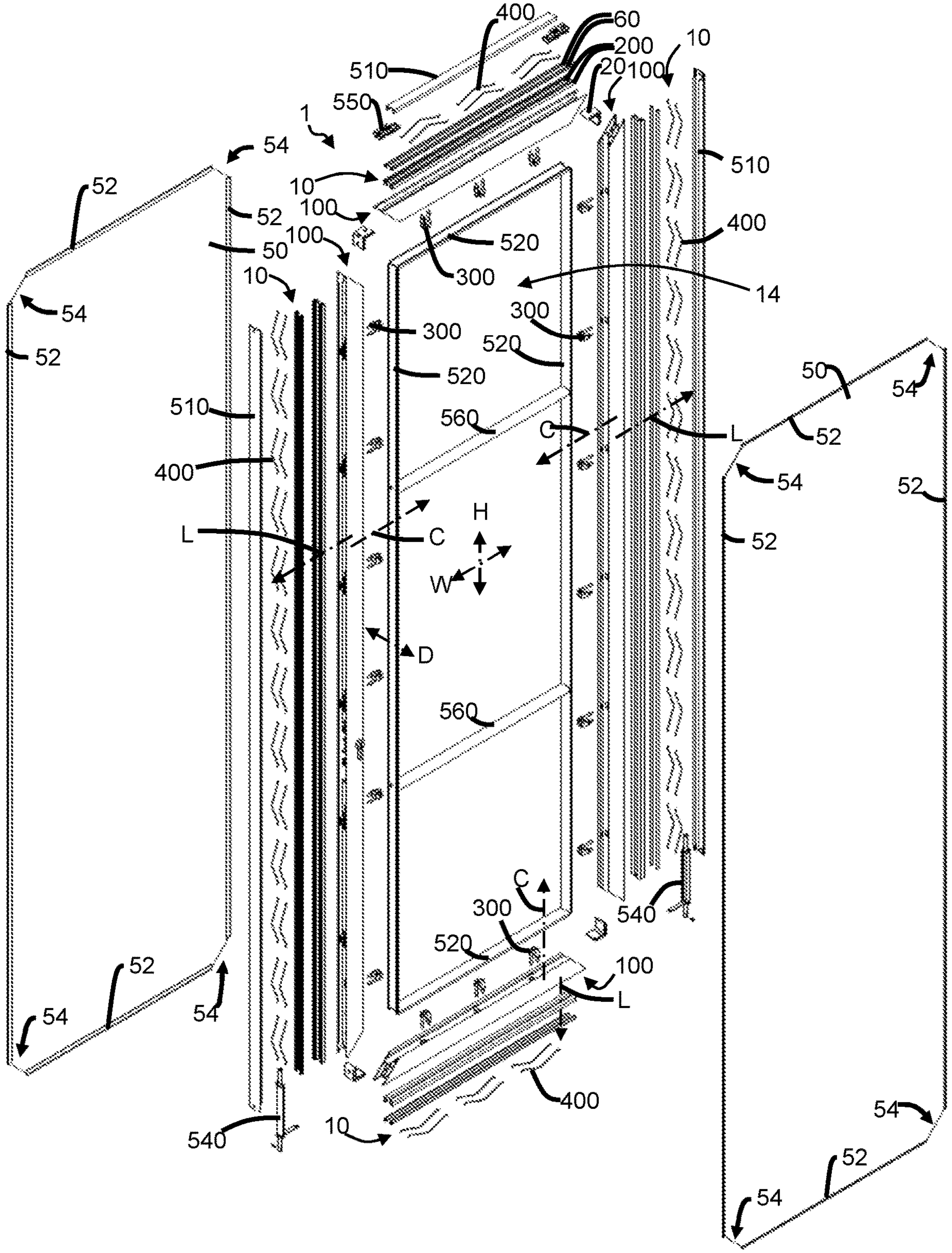
FIG. 33 is an exploded view of an embodiment of a double-sided canvas frame.
Figure 34:
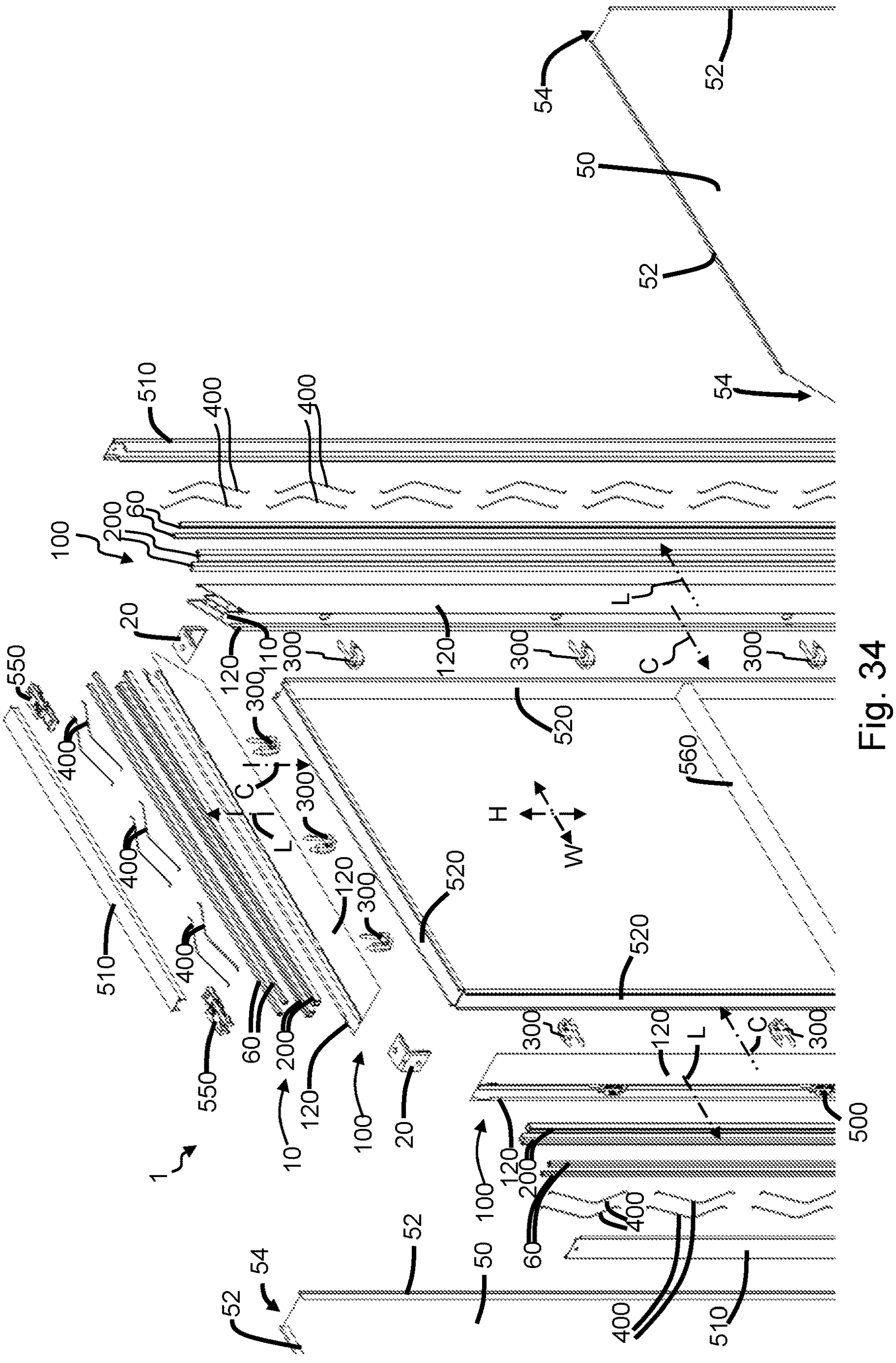
FIG. 34 is a detail of FIG. 33 on a larger scale.
Figure 35:
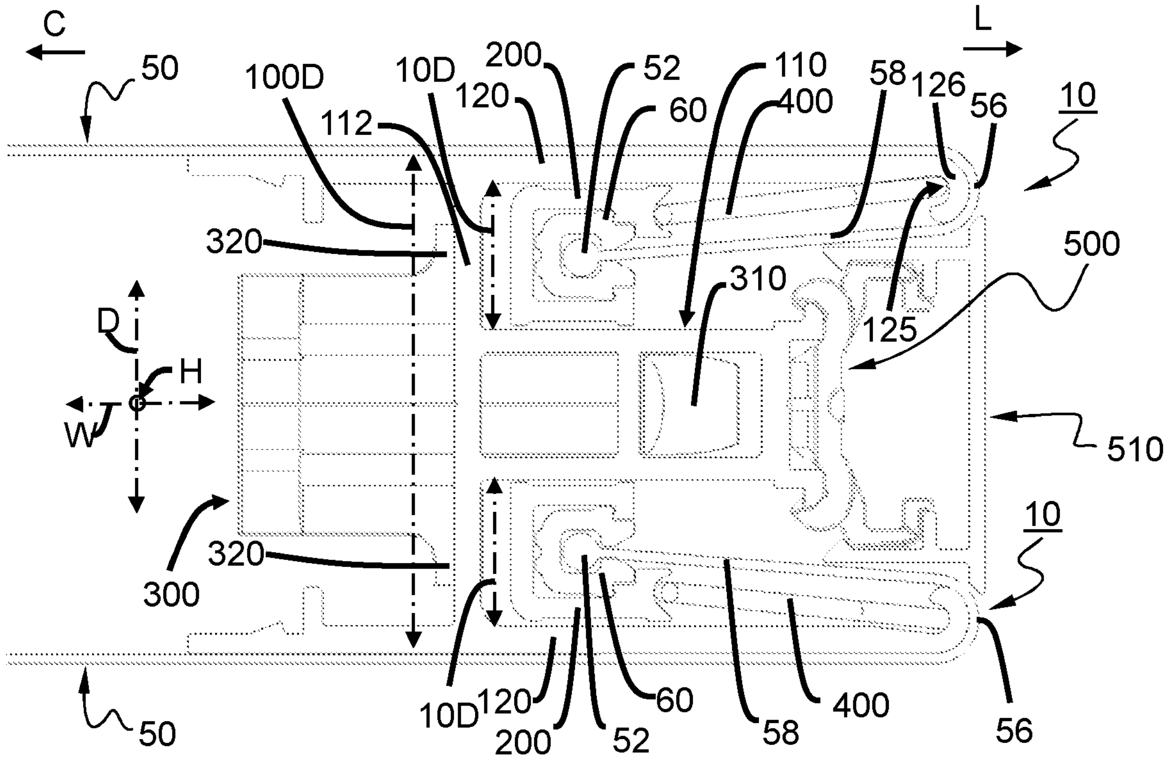
FIG. 35 is a view similar to FIG. 10A of an embodiment of a frame profile of an embodiment of a canvas frame as shown in FIG. 34.

FIGS. 31 and 32 show an embodiment of a single-sided canvas frame, similar to that described above. FIGS. 33 and 34 show an embodiment of a double-sided canvas frame as described above. Similar elements are indicated with similar references and perform a similar function as described above. FIG. 35 shows in more detail a similar view of the frame profile (100) and the tensioning system (10) as in FIG. 10A. It is clear that for the embodiment example in FIGS. 31 and 32, a similar embodiment with one canvas is possible, similar to FIG. 12. As can be seen in FIGS. 31 to 34, the embodiment of the canvas comprises a zip (52), or some other suitable thickening at the level of the four sides of the perimeter of the canvas (50). It is clear that according to alternative embodiments, the zip (52) for example is only provided on two opposite sides of the perimeter of the canvas. According to the embodiment example presented, it is clear that at the level of the corners (54) of the canvas (50) there is a zone where no zip is fitted to the perimeter. This optional embodiment makes it easier to push the zip (52) into the canvas fastening element (60) for fastening the canvas (50), for example as shown in detail in FIG. 35.

As shown for example in FIG. 35, it is clear that according to the embodiment examples presented, in the fastened state, the part (58) of the canvas (50) fastened to the guide (200) is located between the side walls (120) of the frame profile (100). Or in other words, the perimeter of the canvas (50), which is fastened by means of the zip (52) and the canvas fastening element (60) to the guide (200), is located between the side walls (120) of the frame profile (100), or in other words inside the internal space of the frame profile (100), preferably completely inside the internal space of the frame profile (100). As shown, in this fastened state, the canvas (50) extends along the outward-directed plane of a side wall (120) of the frame profile (100), up to a bending point (56) at the level of the lateral end (126) of the side wall (120), round which the canvas (50) is bent toward an internal part of the frame profile (100) between both side walls (120). As can be seen in FIG. 35, a part (58) of the canvas (50) extends beyond this bending point (56) between the side walls (120) of the frame profile (100) up to the guide (200). There, the end of this part (58), which forms the perimeter of the canvas (50), is fastened to the guide (200) by means of the zip (52) and the canvas fastening element (60). As shown in FIG. 35, it is advantageous if the part (58) of the canvas (50) that extends from the guide (200) up to a bending point (56) on the side wall (120) of the frame profile (100), extends in a depth direction (D) over a distance (10D) in the region of 60% or less, preferably in the region of 50% or less, preferably 40% or less of the distance (100D) over which the frame profile (100) extends in the depth direction (D). According to the embodiment example presented, both the guide (200), and the tensioning means (400) only extend over a distance (10D) in the depth direction (D) in the region of 60% or less, preferably in the region of 50% or less, preferably 40% or less of the distance (100D) over which the frame profile (100) extends in the depth direction (D). As shown in FIG. 35, this makes it possible, even with double-sided canvas frames, to keep, in the depth direction (D), a free space available between the parts of the tensioning systems (10) inserted between the side walls, for example for applying a suitable fitting (500) or other suitable elements. It is clear that this also applies to the embodiments presented of the single-sided canvas frames. Moreover, it is clear that the depth direction (D) extends transversely relative to the longitudinal direction of the frame profile (100) and the lateral direction (L), or in other words transversely to the longitudinal plane of the frame, or in other words, transversely or approximately transversely to the longitudinal plane of the side walls (120), or in other words parallel or approximately parallel to the longitudinal plane of the back wall (112) of the embodiments presented of the frame profile (100). Moreover, it is also clear that the canvas (50) that is fastened to a side of the frame, i.e. on the part of one of the side walls (120) of the frame profile (120), does not extend, in the depth direction (D), up to, or beyond, the other side of the frame, i.e. up to or beyond the other side wall (120) of the frame profile (100). This available space is advantageous for at least partially fitting and/or fastening elements for example such as a fitting (500), fastening mechanisms (550), a hinge (540), and/or any other suitable elements between the side walls (120) of the canvas frame (1).

It is also clear that the frame profile (100), and the guide (200) or guides (200) that are movable in the frame profile, are elongated elements with a central longitudinal axis that is parallel. It is also clear that the movable guides (200), according to an embodiment shown, are movable in the frame profile (100) in which they are fitted. It is also clear that according to such embodiments these movable guides (200) are mounted movably in the frame profile (100) in a direction transverse to the central longitudinal axis of the frame profile (100) and the movable guide (200), in other words they are slidable between the central part (110) and a side wall (120) in the frame profile (100), so that they can slide in a direction transverse to the central longitudinal axis of the frame profile (100), in other words in the central direction (C) and the lateral direction (L). It is also clear that according to an embodiment shown, the movable guide (200) or guides (200) are located completely in the frame profile (100). It is also clear that according to embodiments shown, the movable guides (200) of two opposite frame profiles (100) of a frame (1) are movable in these frame profiles (100) in order to stretch the canvas in a direction transverse to the longitudinal direction (100) of these frame profiles (100). It is also clear that according to an embodiment shown, the frame (1) comprises a rectangular perimeter that is formed by four frame profiles (100), and comprises a movable guide (200) or two movable guides, and wherein the canvas is fastened and tensioned in a first direction by means of the movable guides (200) in a first pair of opposite frame profiles, and wherein the canvas is fastened and tensioned in a second direction, transverse to the first direction by means of the movable guides (200) in the second pair of opposite frame profiles of the frame. It is also clear that in an embodiment with a double-sided canvas frame, both canvases are fitted to either side of the central longitudinal plane of the canvas frame.

The invention claimed is:

1. A single-sided tensioning system for the dynamic tensioning of at least one canvas provided on one side of a frame, which is assembled substantially from four or more frame profiles, the tensioning system comprising:

a frame profile comprising a back wall with an upright central part and two upright side walls, which extend in the lateral direction of the frame; wherein the frame profile is provided with at least one stop;

a guide provided with a fastener configured to fasten a canvas; wherein the guide is mounted movably in the lateral direction in the frame profile between the central part and a side wall of the two upright side walls;

a locking element comprising a coupler and a blocking piece; wherein the coupler is configured to couple the locking element to the central part;

a tensioner configured for dynamic tensioning of the canvas fastened to the guide; wherein the tensioner is configured in at least one of the following configurations:

the tensioner is tensioned between the stop and guide to tension the guide dynamically in the central direction of the frame, the blocking piece configured to block a movement of the guide in at least one direction, and the tensioner is tensioned between the blocking piece and guide to tension the guide dynamically in the central direction of the frame, the stop configured to block a movement of the guide in at least one direction;

wherein at least one of the locking element and the blocking piece is configured to remove said blocking of the guide displacement relative to the frame profile so that the canvas fastened to the guide is tensioned dynamically over the side wall of the frame profile by the tensioner.

2. A double-sided tensioning system for the dynamic tensioning of at least two canvases provided on either side of a frame, which is assembled substantially from four or more frame profiles, the tensioning system comprising:

a frame profile comprising a back wall with an upright central part and two upright side walls, which extend in the lateral direction of the frame; wherein the frame profile is provided with at least one stop on either side;

at least two guides, each provided with a fastener configured to fasten a different canvas; wherein each guide is mounted movably in the lateral direction in the frame profile-between the central part and a different side wall of the two upright side walls;

a locking element comprising a coupler and at least two blocking pieces provided on either side of the locking element; wherein the coupler is configured to couple the locking element to the central part;

at least two tensioners configured for dynamic tensioning of the canvases fastened to the at least two guides;

wherein each of the at least two tensioners is configured in at least one of the following configurations:

the tensioner is tensioned between a respective stop and guide to tension the guide dynamically in the central direction of the frame, each of the at least two blocking pieces configured to block a movement of a respective guide in at least one direction, and the tensioner is tensioned between a respective blocking piece and guide to tension the guide dynamically in the central direction of the frame, each of the stops configured to block a movement of a respective guide in at least one direction;

wherein at least one of the locking element and the blocking pieces is configured to remove said blocking of the guides by displacement relative to the frame profile so that the canvases fastened to the at least two guides are tensioned dynamically over the different side walls of the frame profile.

3. The tensioning system as claimed in claim 1, wherein at least one of the two upright side walls of the frame profile is provided with an inward-directed stop the tensioner tensioned between this the inward-directed stop and the guide.

4. The tensioning systemas claimed in claim 1, wherein the central part of the frame profile is provided with at least one outward-directed stop the tensioner tensioned between the outward-directed stop and the guide.

5. The tensioning system as claimed in claim 1, wherein the coupler is configured to couple the locking element to the central part in at least two positions comprising a pushed-in position and a pushed-out position;

wherein displacement of the locking element, from a pushed-in to a pushed-out position or from a pushed-out to a pushed-in position tensions the canvas.

6. The tensioning systemas claimed in claim 1, wherein the guide is provided with a sideways-projecting blocking wall with an end that is adapted for contact with the stop of the frame profile to block a movement of this guide in at least one direction.

7. The tensioning system as claimed in claim 1, wherein the locking element comprises at least one impressible projection; the impressible projection comprising an outward-directed hooking point; wherein the central part of the frame profile comprises a hooking-in point on which a hooking point can hook firmly to couple the locking element to the central part; wherein the locking element is configured to uncouple from the central part by pressing-in the impressible projection.

8. The tensioning system as claimed in claim 7, wherein at least one impressible projection comprises an outward-directed sloping end face configured to enable the projection to be pushed in by a displacement of the locking element in the central part.

9. The tensioning system as claimed in claim 1, wherein the blocking piece projects sideways from the locking element and comprises a flattened end adapted for contact with the guide.

10. The tensioning system as claimed in claim 1, wherein the back wall of the frame profile comprises an opening under the central part, the locking element placed along the opening in the central part is configured to be pushed-in in the lateral direction of the frame.

11. The tensioning system as claimed in claim 1, wherein the central part of the frame profile comprises an opening, the locking element placed along the opening in the central part is configured to be pushed-in in the central direction of the frame.

12. The tensioning systemas claimed in claim 1, wherein the the tensioner comprises one or more elastic elements, one or more spring elements, or a combination thereof.

13. The tensioning systemas claimed in claim 1, wherein the stop, the guide, or a combination thereof is provided with a recess for inserting the tensioner.

14. The tensioning system as claimed in claim 1, further comprising a canvas fastening element for fastening the canvas, the canvas fastening element configured to be slid into the guide.

15. The tensioning systemas claimed in claim 1, wherein:
- a part of the canvas fastened to the guide is located between the side walls of the frame profile;
- at least one of the guide, the part of the canvas that extends from the guide up to a bending point on the side wall of the frame profile, and the tensioner extends in a depth direction over a distance in the region of 60% or less of the distance over which the frame profile extends in the depth direction, wherein the depth direction extends transversely relative to the longitudinal direction of the frame profile and the lateral direction.

16. A single-sided canvas frame comprising a frame provided with a single-sided tensioning system as claimed in claim 1 and a canvas, wherein the canvas is tensioned dynamically on one side of the frame.

17. A double-sided canvas frame comprising a frame provided with a double-sided tensioning system as claimed in claim 2 and two canvases, wherein the canvases are tensioned dynamically on either side of the frame.

18. The use of a canvas frame comprising a frame provided with a single-sided tensioning system as claimed in claim 1 as a roof, partition, wall, door or closure, or as a panel in a roof, partition, wall, door or closure.

19. A method for the dynamic tensioning of a canvas (50) on one side of a frame provided with a single-sided tensioning system (10) as claimed in claim 1, the method comprising:
- providing the frame profile;
- placing the guide in the frame profile between the central part and the side wall;
- providing the locking element;
- tensioning the tensioner between (i) at least one of the stop and blocking piece, and (ii) the guide;
- fastening the canvas to the guide, wherein the canvas is folded over the side wall of the frame profile; and
- displacing the locking element so that the canvas is stretched over the side wall of the frame profile.

20. A method for dynamic tensioning of two canvases (50) on either side of a frame provided with a double-sided tensioning system as claimed in claim 2, the method comprising:
- providing the frame profile;
- placing a first of the two guides in the frame profile-between the central part and a first of the two side walls thereof and
- placing a second of the two guides in the frame profile between the central part and a second of the two side walls thereof;
- providing the locking element;
- tensioning a first of the at least two tensioners between at least one of (i) a first of the stops and blocking pieces, and (ii) a first of the at least two guides, and
- tensioning a second of the at least two tensioners between at least one of (i) a second of the stops and and blocking pieces, and (ii) a second of the at least two guides;
- fastening a first of the at least two canvases to the first guide, wherein the first canvas is folded over a first of the two side walls of the frame profile, and
- fastening a second of the at least two canvases to the second guide, wherein the second canvas is folded over a second of the two side walls of the frame profile; and
- displacing the locking element so that the first canvas is stretched over the first side wall of the frame profile and the second canvas is stretched over the second side wall of the frame profile.

21. The method as claimed in claim 19, further comprising:
- at least partially inserting the locking elementin the central part of the frame profile;
- coupling the locking element to the central part in a first position, wherein the first position coincides with a pushed-in or pushed-out position of the locking element; and,
- coupling the locking element to the central part in a second position, wherein the second position coincides with a pushed-out or pushed-in position of the locking element.

* * * * *